US012682408B2

(12) United States Patent
Huang et al.

(10) Patent No.: US 12,682,408 B2
(45) Date of Patent: Jul. 14, 2026

(54) SOCIAL NETWORK APPLICATION DATA PROCESSING METHOD, COMPUTER DEVICE, AND STORAGE MEDIUM

(71) Applicant: TENCENT TECHNOLOGY (SHENZHEN) COMPANY LIMITED, Shenzhen (CN)

(72) Inventors: Xiaofeng Huang, Shenzhen (CN); Qingjie Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 18/595,775

(22) Filed: Mar. 5, 2024

(65) Prior Publication Data

US 2024/0214338 A1 Jun. 27, 2024

Related U.S. Application Data

(63) Continuation of application No. PCT/CN2023/087292, filed on Apr. 10, 2023.

(30) Foreign Application Priority Data

May 26, 2022 (CN) .......................... 202210581711.7

(51) Int. Cl.
| | |
|---|---|
| *H04L 51/10* | (2022.01) |
| *G06F 3/0482* | (2013.01) |
| *G06Q 50/10* | (2012.01) |

(52) U.S. Cl.
CPC ............ *H04L 51/10* (2013.01); *G06F 3/0482* (2013.01); *G06Q 50/10* (2013.01)

(58) Field of Classification Search
CPC ......... H04L 51/10; H04L 67/02; H04L 51/52; H04L 67/306; H04L 51/212;
(Continued)

(56) References Cited

U.S. PATENT DOCUMENTS

| | | | |
|---|---|---|---|
| 9,329,748 B1 | 5/2016 | Mitchell | |
| 2008/0168154 A1* | 7/2008 | Skyrm | ................... H04L 65/75 709/218 |

(Continued)

FOREIGN PATENT DOCUMENTS

| | | |
|---|---|---|
| CN | 103067379 A | 4/2013 |
| CN | 108563684 A | 9/2018 |
| CN | 110196673 A | 9/2019 |

OTHER PUBLICATIONS

Yang et al., 2020. Snapstream: Snapshot-based Interaction in Live Streaming for Visual Art. In Proceedings of the 2020 CHI Conference on Human Factors in Computing Systems (CHI '20). Association for Computing Machinery, New York, NY, USA, 1-12. (Year: 2020).*

(Continued)

*Primary Examiner* — Taylor A Elfervig
(74) *Attorney, Agent, or Firm* — Anova Law Group, PLLC

(57) ABSTRACT

A social network application data processing method includes: displaying an aggregation sharing interface in response to a trigger operation on an aggregation sharing portal, the aggregation sharing interface including multimedia materials of one or more categories; determining, in response to a selection operation on N target multimedia materials in the multimedia materials in the aggregation sharing interface, the selected N target multimedia materials as N sharing target multimedia materials, N being a positive integer; and generating one or more aggregation sharing messages for the N target multimedia materials based on the one or more categories, and transmitting the one or more aggregation sharing messages to a sharing object for aggregation sharing.

20 Claims, 25 Drawing Sheets

Server 101

Aggregation sharing request
Aggregation sharing message
Aggregation sharing message
Aggregation sharing message First terminal 100a     Second terminal 100b     Third terminal 100c

(58) Field of Classification Search

CPC .. G06F 3/0482; G06F 16/9535; G06F 16/954; G06F 21/10; G06F 2216/15; G06F 16/9536; G06Q 50/10; G06Q 50/01; H04W 4/21; H04W 4/02; H04W 4/021; H04M 1/72439; H04M 1/2757; H04M 1/576; H04M 15/844; H04M 15/8221

USPC ........................................................ 709/206

See application file for complete search history.

(56) References Cited

U.S. PATENT DOCUMENTS

2015/0185994 A1*  7/2015  Antipa .................. G06F 40/143
                                                              715/201
2017/0003924 A1*  1/2017  Brooks .................. G09G 5/005
2017/0099248 A1*  4/2017  Pisenti ................... H04L 51/10
2018/0367484 A1* 12/2018  Rodriguez .............. H04L 67/75
2023/0217067 A1*  7/2023  Atkins ................. H04N 21/435
                                                              386/353

OTHER PUBLICATIONS

Churchhill et al., 2004. Sharing multimedia content with interactive public displays: a case study. In Proceedings of the 5th conference on Designing interactive systems: processes, practices, methods, and techniques (DIS '04). Association for Computing Machinery, New York, NY, USA, 7-16. (Year: 2004).*

Miller et al., 2021. Meeting with Media: Comparing Synchronous Media Sharing and Icebreaker Questions in Initial Interactions via Video Chat. Proc. ACM Hum.-Comput. Interact. 5, CSCW2, Article 374 (Oct. 2021), 26 pages. (Year: 2021).*

The World Intellectual Property Organization (WIPO) International Search Report for PCT/CN2023/087292 Jun. 19, 2023 6 Pages (including translation).

* cited by examiner

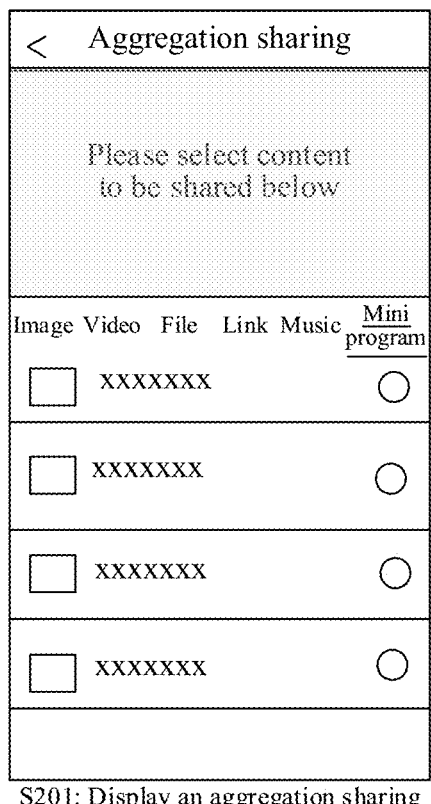

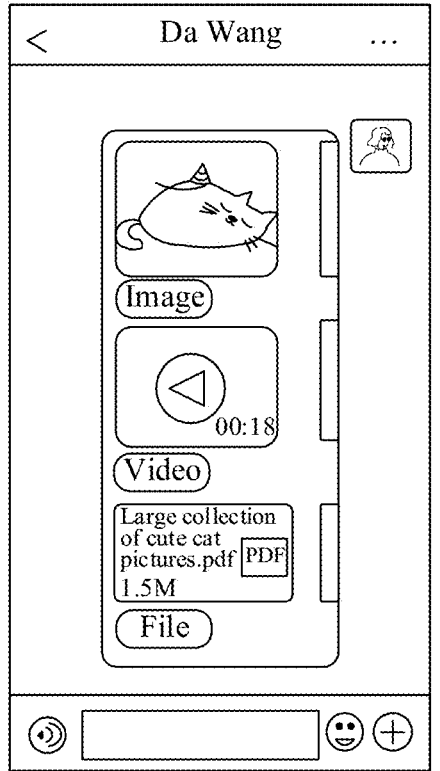

S201: Display an aggregation sharing interface in response to a trigger operation on an aggregation sharing portal S203: Generate one or more aggregation sharing messages for the N target multimedia materials based on the categories, and transmit the one or more aggregation sharing messages to a sharing object for aggregation sharing

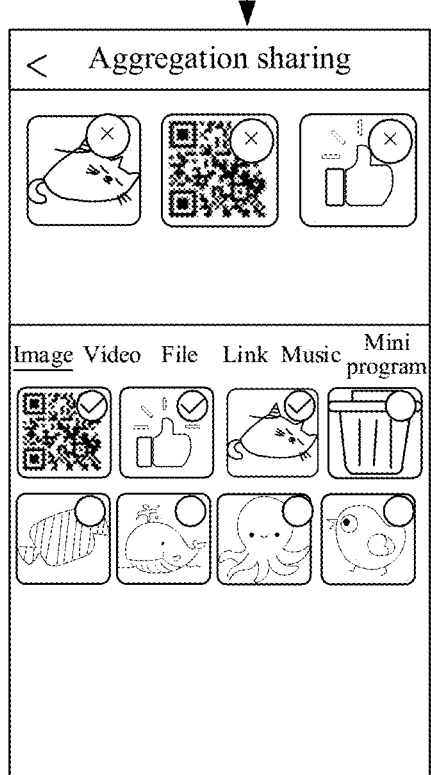

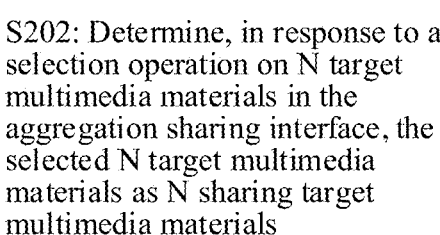

S202: Determine, in response to a selection operation on N target multimedia materials in the aggregation sharing interface, the selected N target multimedia materials as N sharing target multimedia materials

FIG. 2

<   Aggregation sharing

| Image | Video | File | Link | Music | Mini program |

☐   xxxxxxx   ○

☐   xxxxxxx   ○

☐   xxxxxxx   ○

☐   xxxxxxx   ○

—5101

(1)    (2)

(1)

(2)

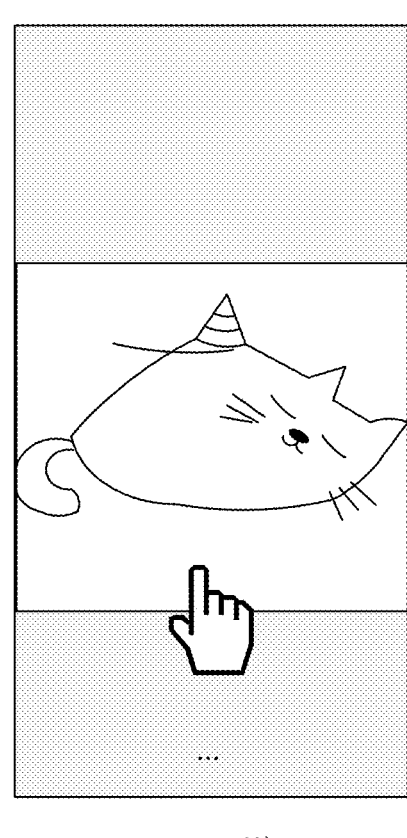
(1)
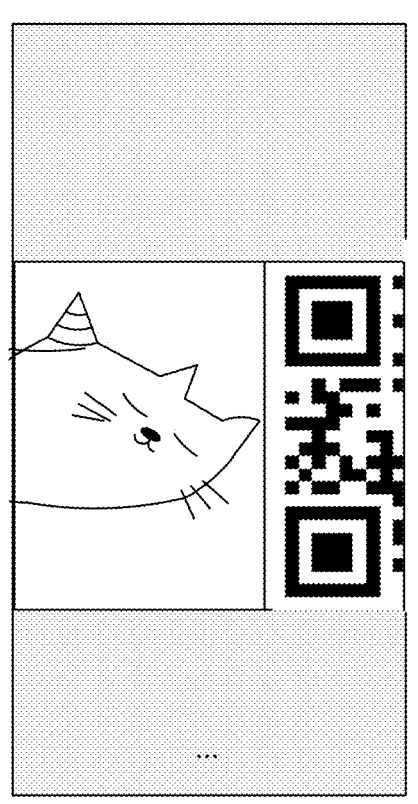
(2)
(3)
FIG. 7i

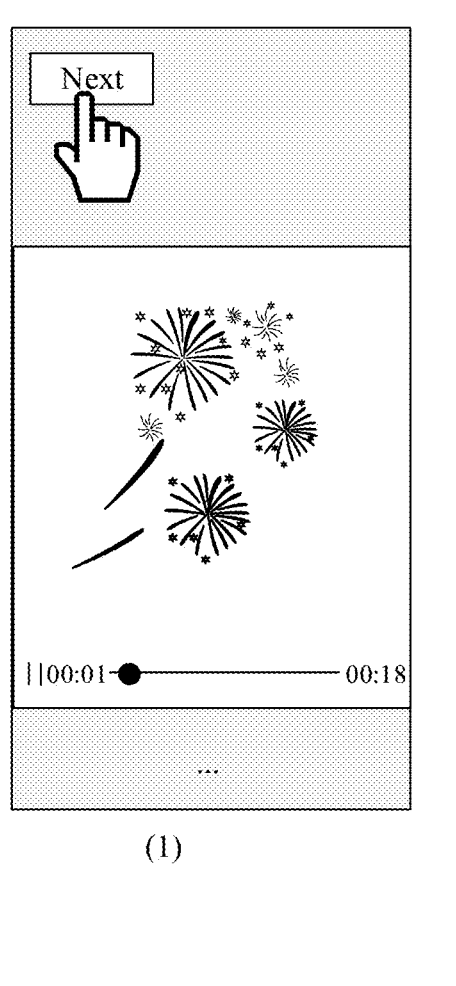
(1)
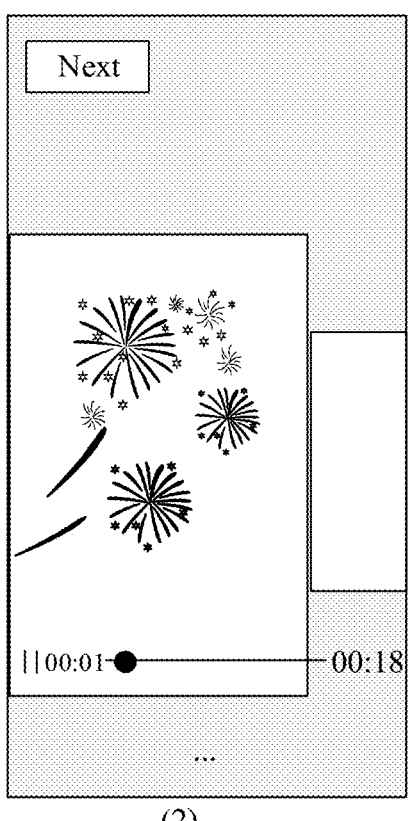
(2)
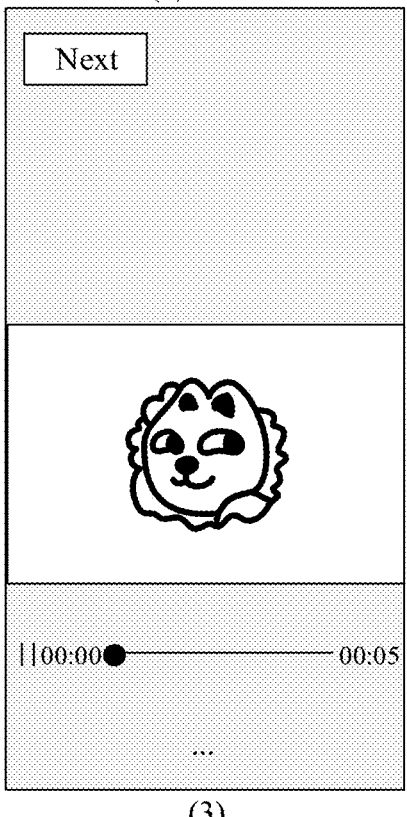
(3)
FIG. 7j

Obtain a display parameter of a terminal screen —S801

Determine a display container adapted to the terminal screen according to the display parameter —S802

Render and display a target multimedia material in an aggregation sharing message in the display container —S803

FIG. 8

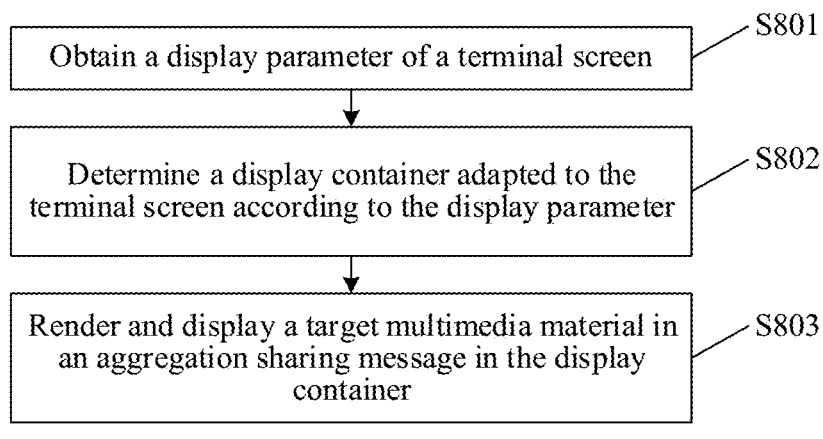

Image drawing

Obtain container rendering information (for example, a width and a height)

Load an image and obtain the rendering information

Compare an aspect ratio of a container and that of the image

The image is larger than the container

Image height = container height, width = image height/image aspect ratio

The image is less than the container

Image width = container width, height = image height * image aspect ratio

Rendering ends

FIG. 9a

SOCIAL NETWORK APPLICATION DATA PROCESSING METHOD, COMPUTER DEVICE, AND STORAGE MEDIUM

CROSS-REFERENCES TO RELATED APPLICATIONS

This application is a continuation application of PCT Patent Application No. PCT/CN2023/087292, filed on Apr. 10, 2023, which claims priority to Chinese Patent Application No. 202210581711.7, filed on May 26, 2022, all of which is incorporated herein by reference in their entirety.

FIELD OF THE TECHNOLOGY

The present disclosure relates to the field of computer technologies, and, in particular, to a social network application data processing method and apparatus, a computer device, a computer-readable storage medium, and a computer program product.

BACKGROUND OF THE DISCLOSURE

With development of Internet technologies, various applications (for example, an instant messaging application) with social functions have become an important communication tool. Social conversations can be conducted via social media applications to generate conversation messages. To a conversation object, some conversation messages are of great values for sharing, especially those including multimedia content information (for example, a picture, a video, and/or a mini program), which are frequently shared by the conversation object.

SUMMARY

One embodiment of the present disclosure provides a social network application data processing method, performed by a computer device. The method includes displaying an aggregation sharing interface in response to a trigger operation on an aggregation sharing portal, the aggregation sharing interface comprising multimedia materials of one or more categories; determining, in response to a selection operation on N target multimedia materials in the multimedia materials in the aggregation sharing interface, the selected N target multimedia materials as N sharing target multimedia materials, and N being a positive integer; and generating one or more aggregation sharing messages for the N target multimedia materials based on the one or more categories, and transmitting the one or more aggregation sharing messages to a sharing object for aggregation sharing.

Another embodiment of the present disclosure provides a computer device, including one or more processors, a memory, and a network interface, the one or more processors being connected to the memory and the network interface, the network interface being configured to provide a network communication function, the memory being configured to store program code, and the one or more processors being configured to invoke the program code to perform a social network application data processing method. The method includes displaying an aggregation sharing interface in response to a trigger operation on an aggregation sharing portal, the aggregation sharing interface comprising multimedia materials of one or more categories; determining, in response to a selection operation on N target multimedia materials in the multimedia materials in the aggregation sharing interface, the selected N target multimedia materials as N sharing target multimedia materials, and N being a positive integer; and generating one or more aggregation sharing messages for the N target multimedia materials based on the one or more categories, and transmitting the one or more aggregation sharing messages to a sharing object for aggregation sharing.

Another embodiment of the present disclosure provides a non-transitory computer-readable storage medium, storing a computer program, the computer program comprising program instructions, the program instructions, when being executed, causing one or more processors to perform a social network application data processing method. The method includes displaying an aggregation sharing interface in response to a trigger operation on an aggregation sharing portal, the aggregation sharing interface comprising multimedia materials of one or more categories; determining, in response to a selection operation on N target multimedia materials in the multimedia materials in the aggregation sharing interface, the selected N target multimedia materials as N sharing target multimedia materials, and N being a positive integer; and generating one or more aggregation sharing messages for the N target multimedia materials based on the one or more categories, and transmitting the one or more aggregation sharing messages to a sharing object for aggregation sharing.

BRIEF DESCRIPTION OF THE DRAWINGS

FIG. 2 is a schematic flowchart of a social network application data processing method according to some exemplary embodiments of the present disclosure.

FIG. 7i and FIG. 7j are schematic diagrams of switching and displaying target multimedia materials on a material detail page according to some exemplary embodiments of the present disclosure.

FIG. 8 is a schematic flowchart of a social network application data processing method according to some exemplary embodiments of the present disclosure.

FIG. 9a is a flowchart of adaptive image rendering according to some exemplary embodiments of the present disclosure.

DESCRIPTION OF EMBODIMENTS

Figure 1:
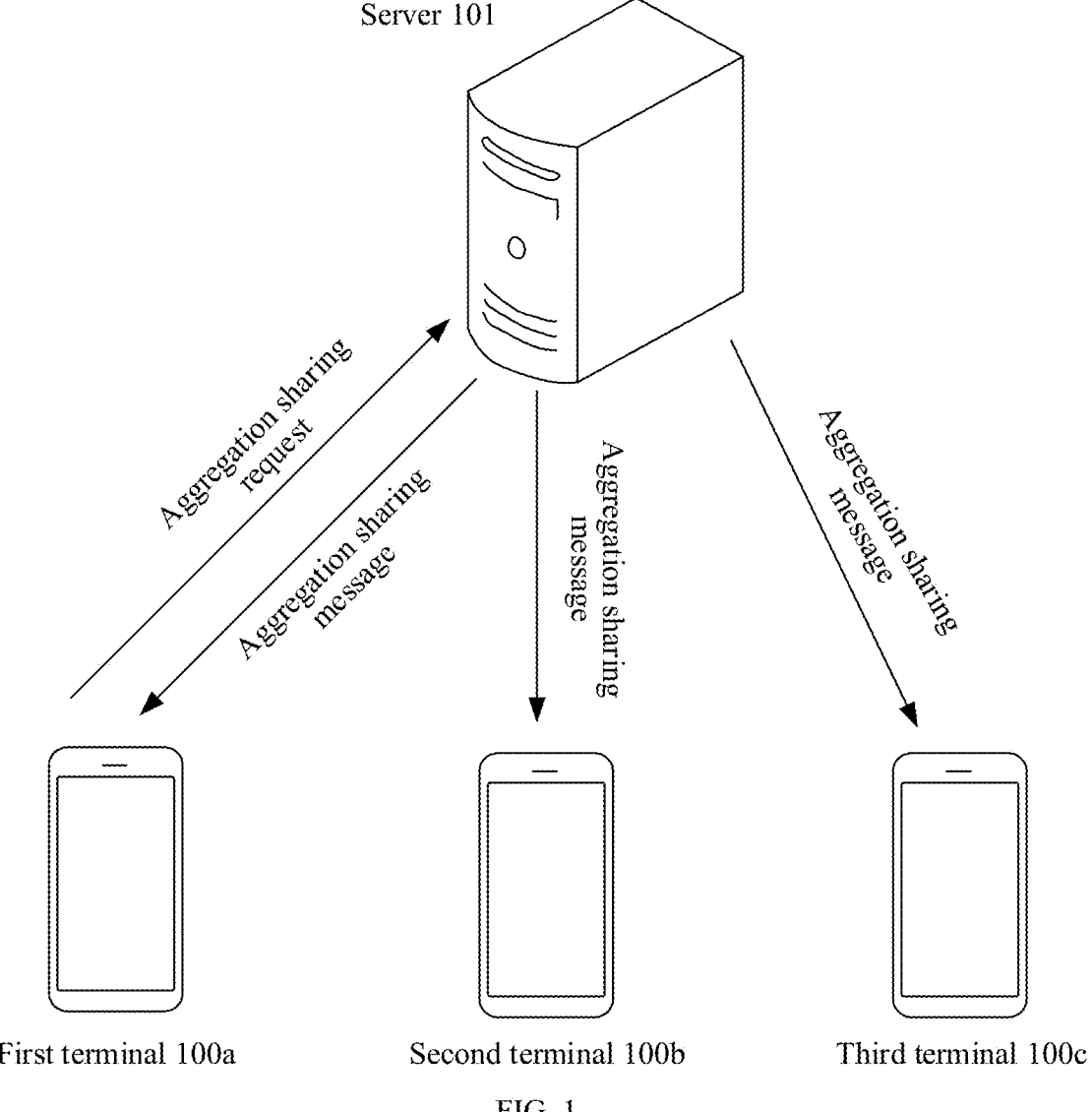
FIG. 1 is an architectural diagram of a social network application data processing system according to some exemplary embodiments of the present disclosure.

To better understand solutions in embodiments of the present disclosure, related terms and concepts that may be involved in the embodiments of the present disclosure are described below first.

1. Instant Messaging Application

An instant messaging application, also referred to as an instant communication application, is a software that implements online chatting and communication through instant messaging technologies. An Internet-based instant messaging software may be designed for various mainstream operating systems (such as Windows, Android, and Linux). The instant messaging application has very rich functions. For example, the instant messaging application may support a plurality of functions such as an online chat, a video call, a point-to-point resumable file transfer, a shared file, a network hard disk, a custom panel, and a mailbox, and may be connected to a plurality of communication terminals.

2. Social Conversation Interface

A social conversation interface is a functional interface for conducting a social conversation. The social conversation interface may be provided by a social application client installed in a terminal device. The social conversation interface may display a conversation message sent by a social object participating in the social conversation. The conversation message may include content such as an emoticon, text, voice, a video, an image, a mini program, a link, a file, and/or a geographical location. The mini program is an application that can be used without downloading and installing. The link is configured to jump to open a new page. For example, click/tap a content link of a subscription account to jump to page content corresponding to the subscription account. The file is, for example, a compressed file, an online document, or an offline document. The geographical location may represent location data of an object, for example, shared location data shared by a conversation object.

3. Multimedia Material

A multimedia material is a message dissemination media. The multimedia material may include rich content information and can be shared and stored. In view of content information of different multimedia materials, the multimedia materials may be classified into different categories, including, but not limited to: a picture, a video, a file, a link, a mini program, and the like. The multimedia material in the present disclosure may be sourced from a conversation message in a social conversation.

4. Aggregation Sharing Interface

An aggregation sharing interface is an interface for aggregation sharing (or referred to as merging sharing, for example, merging a plurality of multimedia materials into one message for sharing) of multimedia materials. In the aggregation sharing interface, multimedia materials of different categories can be aggregated and displayed. In addition, multimedia materials needed to be shared can be selected for aggregation sharing.

5. Aggregation Sharing Message

An aggregation sharing message, also referred to as a merged sharing message, is a conversation message that aggregates one or more categories of multimedia materials selected for sharing.

6. Parent Element

A so-called element is a tag in a hyper text markup language (HTML), a markup language for creating a web page. A parent element is a parent tag. For example, a div tag (representing a div container, namely, a display container) wraps a p tag (child element).

Currently, when sharing a plurality of pieces of multimedia content information in a social application, a human-computer interaction operation is cumbersome, processing efficiency is not high enough, and a lot of display space is occupied when too much content is shared. Therefore, a new method needs to be designed to improve human-computer interaction efficiency and utilization of screen space of a terminal device.

Based on the foregoing terms and concepts, an architecture of a social network application data processing system according to an embodiment of the present disclosure is introduced below with reference to the accompanying drawings.

For example, embodiments of the present disclosure provide a social network application data processing method and a related product, which can improve human-computer interaction efficiency, and further improve utilization of screen space of a user device.

FIG. 1 is an architectural diagram of a social network application data processing system according to an exemplary embodiment of the present disclosure. As shown in FIG. 1, the social network application data processing system includes a plurality of terminal devices (including a first terminal 100a, a second terminal 100b, a third terminal 100c . . . ) and a server 101. Each terminal device can establish a communication connection with the server 101 in a wired or wireless manner.

A social network application client is runnable in each terminal device. The social network application client may provide a social conversation function, and a social conversation interface for supporting a social conversation may be displayed through the terminal device. A conversation message may be displayed in the social conversation interface. A multimedia material may be generated based on the conversation message. For example, if the conversation message includes an image, the image may be used as the multimedia material. The terminal device may display an aggregation sharing interface of the social network application client. The aggregation sharing interface includes a plurality of categories of multimedia materials. These multimedia materials may be sourced from a historical conversation message of the social conversation. At least one target multimedia material may be selected through the aggregation sharing interface, and aggregation sharing is performed on the selected target multimedia materials based on the categories, thereby improving convenience of viewing the multimedia materials of different categories. In addition, the social network application client run in the terminal device may match a corresponding display container based on a display parameter of a terminal screen, and adapt the shared target multimedia material to the display container, so that the target multimedia material is displayed on the terminal screen.

The foregoing terminal device includes, but is not limited to, devices such as a mobile phone, a computer, an intelligent voice interaction device, a smart home appliance, an in-vehicle terminal, and an aircraft. This is not limited in the present disclosure. A quantity of terminal devices is not limited in the present disclosure.

The server 101 is configured to provide service support for the social network application client. The service support includes, but is not limited to: managing a conversation message in each social network application client (for example, forwarding the conversation message, classifying and sorting out multimedia materials of different categories in a historical conversation message record), managing a conversation member of a social conversation (for example, setting a permission for the conversation member), and the like. The server 101 may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a CDN, big data, and an artificial intelligence platform, but is not limited thereto. A quantity of servers is not limited in the present disclosure.

By using the first terminal 100a as an example, interaction among all terminals involved in a social network application data processing solution according to an embodiment of the present disclosure is exemplarily described below. It is assumed that a first conversation object corresponding to the first terminal 100a, a second conversation object corresponding to the second terminal 100b, and a third conversation object corresponding to the third terminal 100c are contacts of each other, and the conversation objects are combined into a conversation group Q.

(1) The first terminal 100a displays an aggregation sharing interface. The aggregation sharing interface includes multimedia materials of at least one category. These multimedia materials may be sourced from a historical conversation message in one or more social conversations of the first conversation object. In some embodiments, multimedia materials of different categories included in the aggregation sharing interface are displayed in a preset display manner. The preset display manner includes any one of the following: displaying by category based on the categories of the multimedia materials, displaying in partitions based on sources of the multimedia materials, and displaying in chronological order based on transmitting time of the multimedia materials in the social conversation.

In some embodiments, the first terminal 100a may display the aggregation sharing interface in response to a trigger operation on an aggregation sharing portal in the social conversation interface, to quickly and conveniently jump to the aggregation sharing interface directly from the social conversation interface and quickly reach and find an interface of a multimedia material that needs to be shared, thereby simplifying an operation process required for sharing, reducing time spent on a sharing operation, implementing efficient sharing, and improving human-computer interaction efficiency and processing efficiency of the first terminal 100a. The social conversation interface may be a conversation interface corresponding to the conversation group Q, and the multimedia materials in the aggregation sharing interface may also be sourced from conversation messages sent by the conversation objects in the conversation group Q.

2) The first terminal 100*a* selects N target multimedia materials in the multimedia materials of multiple categories displayed in the aggregation sharing interface. In some embodiments, this step may be performed in response to a selection instruction initiated by the conversation object. The N target multimedia materials are multimedia materials that have been selected and are to be shared in the aggregation sharing interface, and may be of a same category or different categories. It may be seen that the aggregation sharing interface may provide one-stop selection, to facilitate processing the multimedia materials of different categories.

3) The first terminal 100*a* performs aggregation sharing on the selected N target multimedia materials based on the categories.

In the N target multimedia materials, target multimedia materials of one category may be aggregated together, target multimedia materials of different categories are classified and sorted, and the target multimedia materials of the same category may be aggregated into a material set and then be shared. In some embodiments, sorted target multimedia materials may be shared through an aggregation sharing message. In this way, a browsing height of overall information can be effectively reduced, material content of a same category is quickly viewed, and utilization of screen space of a terminal device is improved. In some embodiments, an aggregation sharing request may be sent by the first terminal 100*a* to the server, and the server receives the aggregation sharing request and forwards the aggregation sharing message to a corresponding terminal (for example, the second terminal 100*b*).

In the social network application data processing system according to this embodiment of the present disclosure, the aggregation sharing interface of the social network application client may be displayed by each terminal device. The multimedia material that needs to be shared may be selected in one stop through the aggregation sharing interface, which is very convenient and can improve sharing efficiency and human-computer interaction efficiency to a certain extent. In addition, by performing aggregation sharing on sharing (or to-be-shared) target multimedia materials based on categories, target multimedia materials of a same category can be automatically integrated and then shared at once. The operation is simple. When the sharing target multimedia materials are very complex or are in a very large quantity, because there is no need to share the multimedia materials one by one, performing aggregation sharing based on the categories can not only reduce a browsing height of the multimedia material, but also facilitate quickly viewing multimedia materials of a same category, thereby improving efficiency and convenience of viewing shared multimedia materials, and improving utilization of screen space of the terminal device. This is very convenient and efficient for viewing and sharing the multimedia material.

It may be understood that, in a specific implementation of the present disclosure, related data such as location data and a conversation message is involved. When the foregoing embodiments of the present disclosure are applied to a specific product or technology, user permission or consent is required to be obtained, and relevant collection, use, and processing of data are required to comply with relevant laws, regulations, and standards of relevant countries and regions.

FIG. 2 is a schematic flowchart of a social network application data processing method according to some exemplary embodiments of the present disclosure. The social network application data processing method may be performed by a computer device (for example, the first terminal 100*a* in FIG. 1), a social network application client runs in the computer device, and the social network application data processing method may include the following content.

S201: Display an aggregation sharing interface in response to a trigger operation on an aggregation sharing portal.

Figure 3A:
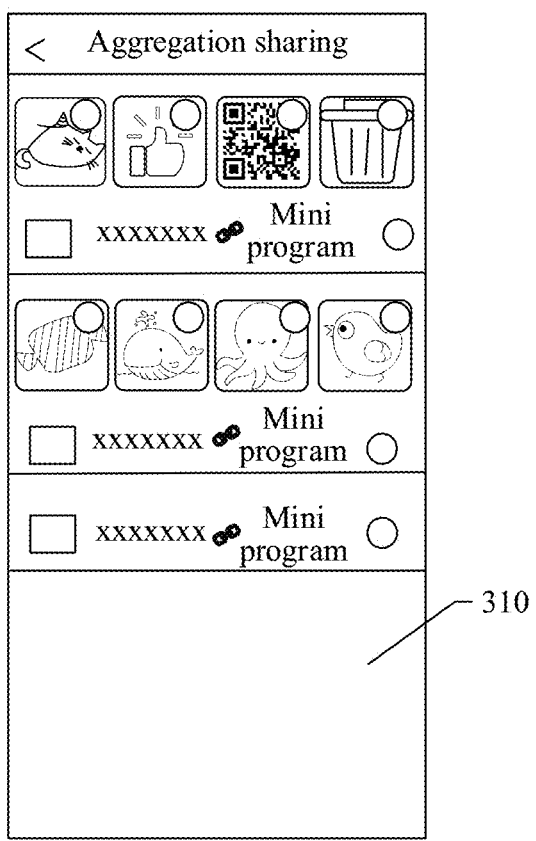
FIG. 3a is a schematic diagram of an exemplary aggregation sharing interface according to an embodiment of the present disclosure.

The aggregation sharing interface includes multimedia materials of one or more categories. In other words, multimedia materials of at least one category may be displayed in the aggregation sharing interface. In some embodiments, the categories of the multimedia materials include one or more of the following: an image, a video, audio, a file, a link, and a mini program. Under one category, a plurality of multimedia materials may be included. For example, multimedia materials of an image category may include a plurality of different or same images, and materials of a file category includes a plurality of files. The multimedia material may be sourced from a historical conversation message in a social conversation. For example, if the historical conversation message includes a video, the video may be used as the multimedia material. In this embodiment of the present disclosure, unless otherwise specified, an image and an image material, for example, are multimedia materials. Exemplarily, FIG. 3*a* is a schematic diagram of an aggregation sharing interface according to an embodiment of the present disclosure. An aggregation sharing interface 310 includes a plurality of image materials and a plurality of mini program materials, and these multimedia materials are selectable.

In some embodiments, multimedia materials of one or more categories are displayed in the aggregation sharing interface based on a preset display policy, and the preset display policy indicates a manner of displaying the multimedia materials. The preset display policy includes any one or more of the following: displaying by category based on categories, displaying in partitions based on sources, and displaying in chronological order based on transmitting time.

In some embodiments, a specific implementation of S201 may be: displaying a social conversation interface, where the social conversation interface includes the aggregation sharing portal; and displaying the aggregation sharing interface in response to the trigger operation on the aggregation sharing portal.

The social conversation interface is for providing a functional interface of a conversation for a conversation object, and the social conversation interface may be a conversation interface corresponding to a conversation group, or may be a conversation interface corresponding to a personal conversation. In the social conversation interface, a conversation message sent by each conversation object may be displayed. The aggregation sharing portal may be provided in the social conversation interface, and the aggregation sharing portal may be an aggregation sharing control or an aggregation sharing option. By triggering (for example, tapping) the aggregation sharing control or the aggregation sharing option, the aggregation sharing control or the aggregation sharing option may make the social conversation interface directly jump to the aggregation sharing interface.

For a display setting of the aggregation sharing portal, different implementations may be included. For example, in an implementation, the aggregation sharing portal is fixedly displayed in the social conversation interface. In other words, the aggregation sharing portal may always exist in the social conversation interface as a fixed control (or option) in the social conversation interface, so that an aggregation sharing function may be quickly enabled for sharing when the conversation object needs to share. In another implementation, the aggregation sharing portal is hidden in the social conversation interface by default, and when the aggregation sharing function is awakened, the aggregation sharing portal is displayed in the social conversation interface. In other words, the aggregation sharing portal may be hidden in the social conversation interface by default, and may be displayed in the social conversation interface only when the aggregation sharing portal is awakened through a corresponding operation. An operation of awakening the aggregation sharing portal may be a trigger operation on any conversation message displayed in the social conversation interface, for example, long pressing the conversation message, or may be a gesture operation, for example, multi-finger sliding, or may be a trigger operation (for example, tapping) on a specified control (or option). Because aggregation sharing may not be frequently used, the aggregation sharing portal is hidden when the aggregation sharing function is not used, and the aggregation sharing portal is evoked when the aggregation sharing function needs to be used, to implement ready-to-use and display.

Figure 3B:
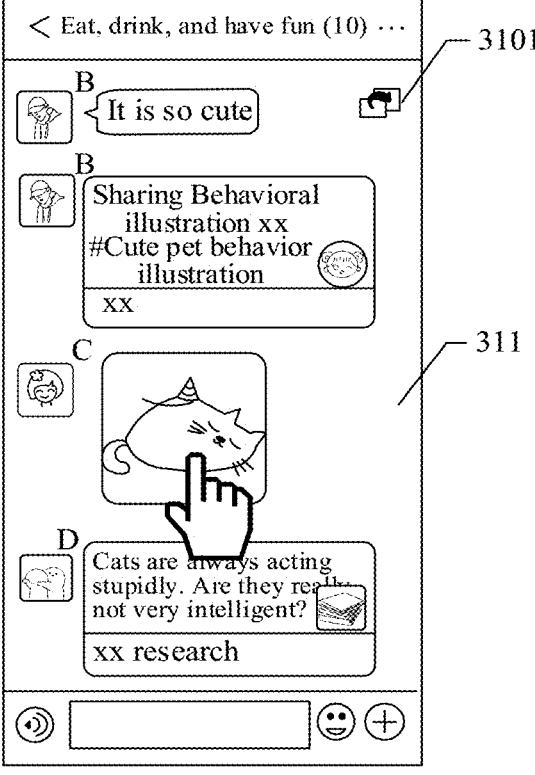
FIG. 3b and FIG. 3c are schematic diagrams of some exemplary settings of an aggregation sharing portal according to an embodiment of the present disclosure.
Figure 3C:
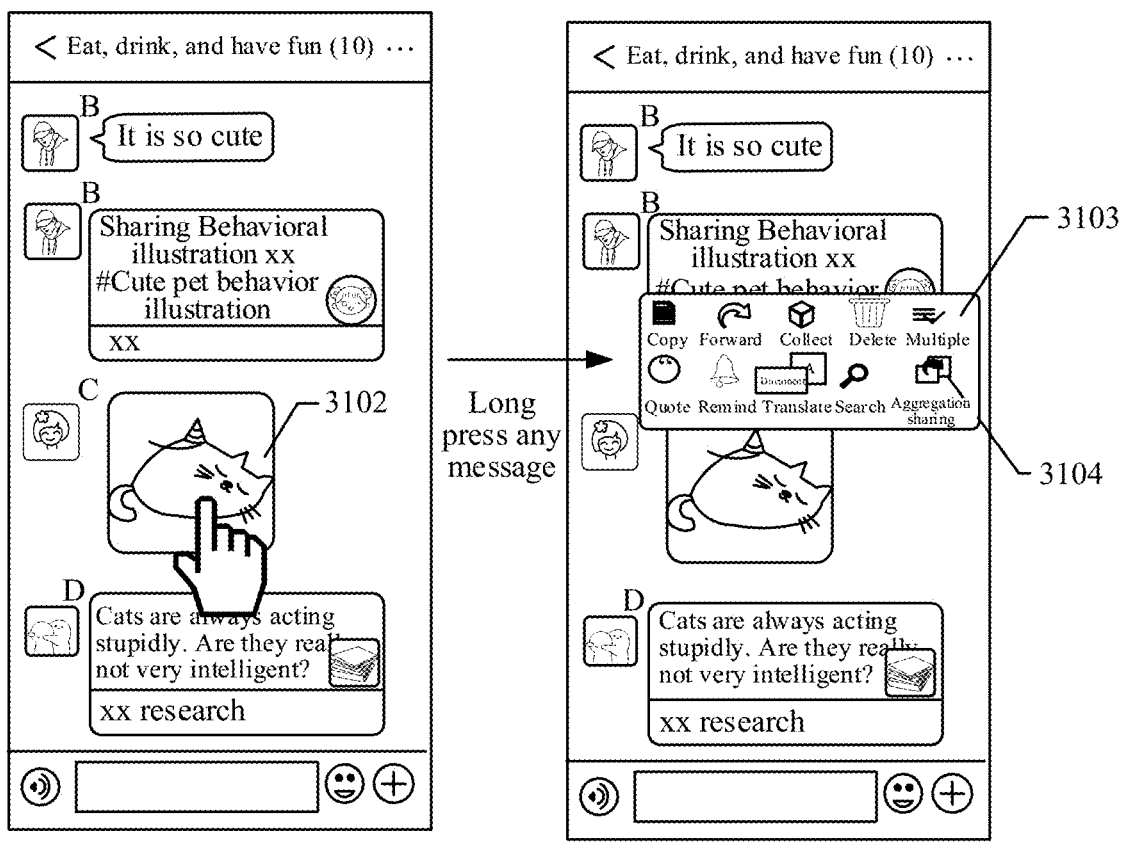

Exemplarily, for a diagram of an effect of the aggregation sharing portal displayed in the social conversation interface, reference may be made to FIG. 3b and FIG. 3c. As shown in FIG. 3b, an aggregation sharing portal 3101 is fixedly provided in a social conversation interface 311. FIG. 3c is a schematic diagram of an operation of awakening an aggregation sharing portal by operating a conversation message. By long pressing any conversation message (for example, a conversation message 3102 sent by a conversation object C) in the social conversation interface, a message operation panel 3103 may be displayed. The message operation panel includes an aggregation sharing portal 3104, and the aggregation sharing portal 3104 may be tapped to jump to display the aggregation sharing interface shown in FIG. 3a.

The trigger operation on the aggregation sharing portal may also be a gesture operation. That is to say, by performing the gesture operation (for example, a gesture operation of a preset graphic trajectory) in the social conversation interface, the aggregation sharing interface may also be displayed.

It may be seen that, in a social conversation scenario, through the aggregation sharing portal in the social conversation interface, the aggregation sharing interface can be quickly entered from the social conversation interface without a very cumbersome operation to enter an interface for selecting a multimedia material that needs to be shared. The operation is simple and less time is taken to present a selectable multimedia material, which can save time required for an overall process of aggregation sharing to a certain extent, and improve sharing efficiency and human-computer interaction efficiency. In addition, due to reduction of an unnecessary operation, processing efficiency of a terminal device is also improved.

S202: Determine, in response to a selection operation on N target multimedia materials in the aggregation sharing interface, the selected N target multimedia materials as N sharing target multimedia materials.

N is a positive integer. Because the aggregation sharing interface includes multimedia materials of multiple categories, N multimedia materials may be selected from the multimedia materials of multiple categories as N target multimedia materials. The target multimedia material is a selected multimedia material among the multimedia materials of multiple categories, and the target multimedia material is waiting to be shared. The N target multimedia materials may be multimedia materials of a same category. For example, the N target multimedia materials are all video materials. Alternatively, the N target multimedia materials may be multimedia materials of different categories. For example, the N target multimedia materials include multimedia materials of multiple categories, such as a video material, a file material, and a mini program material. Therefore, there is no need to exit the aggregation sharing interface when selecting the multimedia materials of different categories, and one-stop selection is performed in the aggregation sharing interface, which is fast and convenient.

Figure 3D:
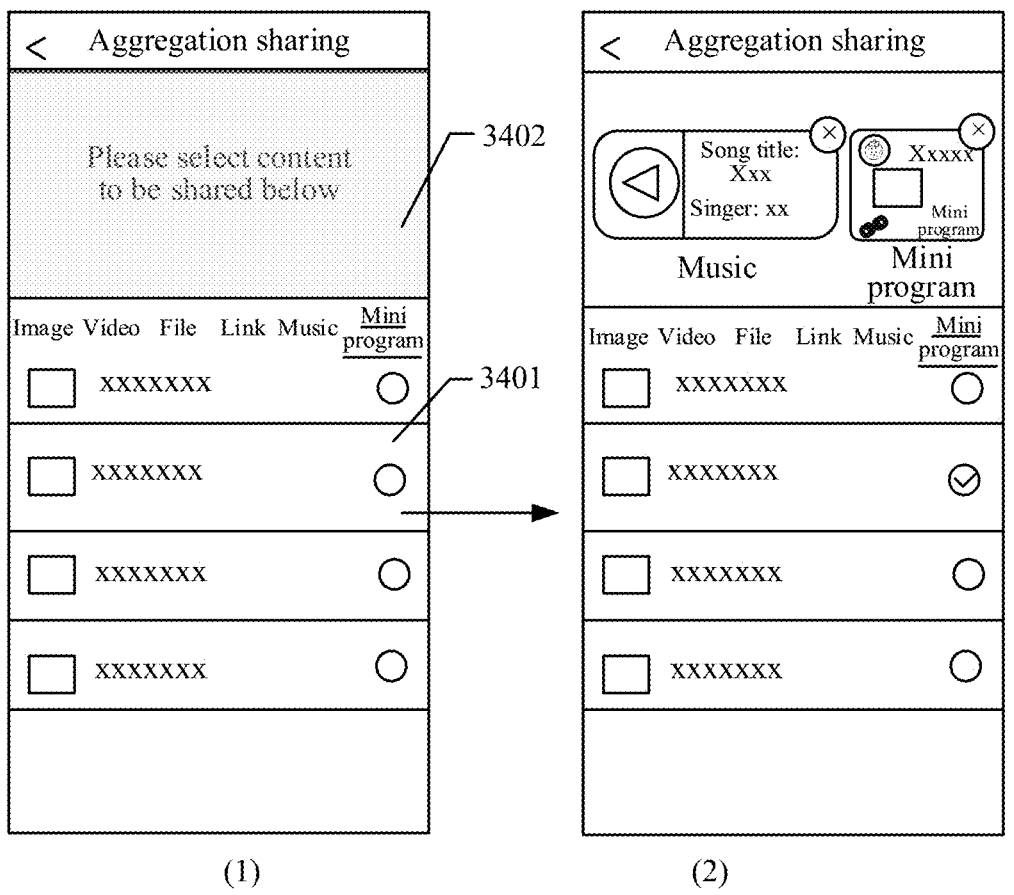
FIG. 3d is a schematic diagram of some exemplary operation effects of selecting a target multimedia material in an aggregation sharing interface according to an embodiment of the present disclosure.

In some embodiments, a material selection area and a material preview area are provided in the aggregation sharing interface; the material selection area is configured for displaying candidate multimedia materials of multiple categories; and the material preview area is configured for displaying the selected sharing target multimedia material. The material selection area and the material preview area are functional areas in the aggregation sharing interface. The material selection area displays a multimedia material for a sharer (namely, an object who initiates aggregate sharing) to select. A target multimedia material selected in the material selection area may be displayed in the material preview area. Exemplarily, FIG. 3d is a schematic diagram of an operation effect of selecting a target multimedia material in an aggregation sharing interface according to an embodiment of the present disclosure. An aggregation sharing interface shown in (1) in FIG. 3d includes a material selection area 3401 and a material preview area 3402. Multimedia materials of categories such as an image, a mini program, and audio may be displayed by category in the material selection area 3401. When any multimedia material in the material selection area is not selected, that "please select content to be shared below" is prompted in the material preview area 3402. When a sharing target multimedia material is selected in the material selection area, the selected target multimedia material may be displayed in the material preview area 3402. Music and a mini program are displayed in a current material selection area as shown in (2) in FIG. 3d.

An operation in a functional area may affect displaying of a multimedia material in another functional area. During selecting the target multimedia material in the material selection area or operating the target multimedia material in the material preview area, the following implementation content may be included: ① adding and displaying, when a sharing target multimedia material is selected in the material selection area, the selected target multimedia material in the material preview area; ② synchronously deleting, when a selected sharing target multimedia material is deselected in the material selection area, the deselected target multimedia material in the material preview area; ③ and synchronously deselecting, when a sharing target multimedia material is deleted in the material preview area, the deleted target multimedia material in the material selection area.

Figure 3E:
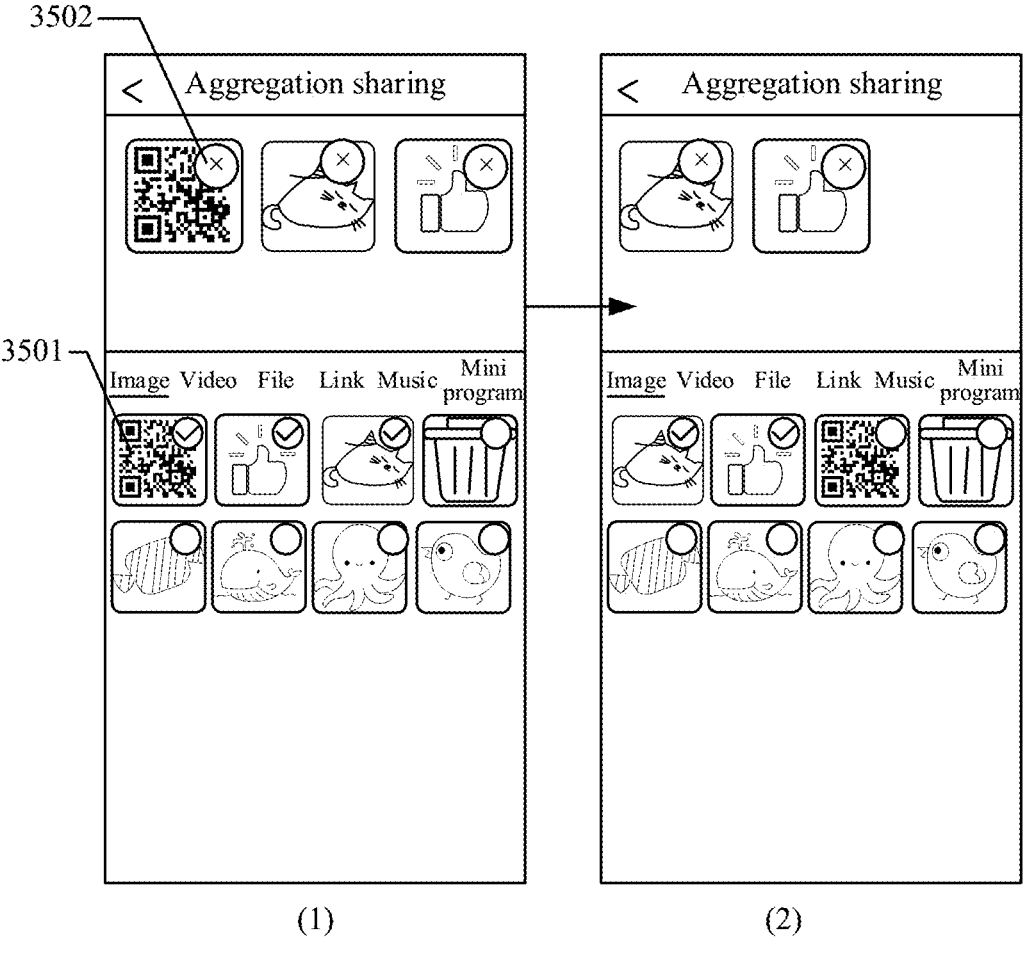
FIG. 3e is a schematic diagram of an effect of selecting a target multimedia material in an aggregation sharing interface according to an embodiment of the present disclosure.

That is to say, the sharing target multimedia material selected in the material selection area may be synchronously presented in the material preview area, and the deselecting of selected target multimedia material in the material selection area may also synchronously cause the deleting of the deselected target multimedia material in the material preview area. In addition, if at least one target multimedia material is displayed in the material preview area, and any target multimedia material is deleted in the material preview area, the target multimedia material is synchronously deselected in the material selection area. Exemplarily, for the foregoing content, reference may be made to a schematic diagram of an effect of a selection operation in an aggregation sharing interface as shown in FIG. 3e. In the material preview area, three pictures selected in the material selection area are displayed. For a same QR code picture, after a corresponding canceling operation is performed in (1) in FIG. 3e based on the above content, an effect shown in (2) in FIG. 3e may be presented. Specifically, when a selected QR code picture 3501 is tapped in the material selection area, the QR code picture 3501 may be deselected, and the QR code picture is synchronously deleted in the material preview area. When a deletion mark 3502 of the QR code picture displayed in the material preview area is tapped, the QR code picture in the material preview area is deleted, and the QR code picture 3501 in the material selection area is synchronously deselected and is in an unselected state.

The target multimedia materials selected in the material selection area are displayed in a centralized through the material preview area, which can facilitate a sharer to preview the selected target multimedia materials in advance. In addition, when deselecting the target multimedia material, there is no need to search in the material selection area. Instead, a canceling operation can be quickly performed in the material preview area, which is very convenient and efficient.

S203: Generate one or more aggregation sharing messages for the N target multimedia materials based on the categories, and transmit the one or more aggregation sharing messages to a sharing object for aggregation sharing.

Figure 3F:
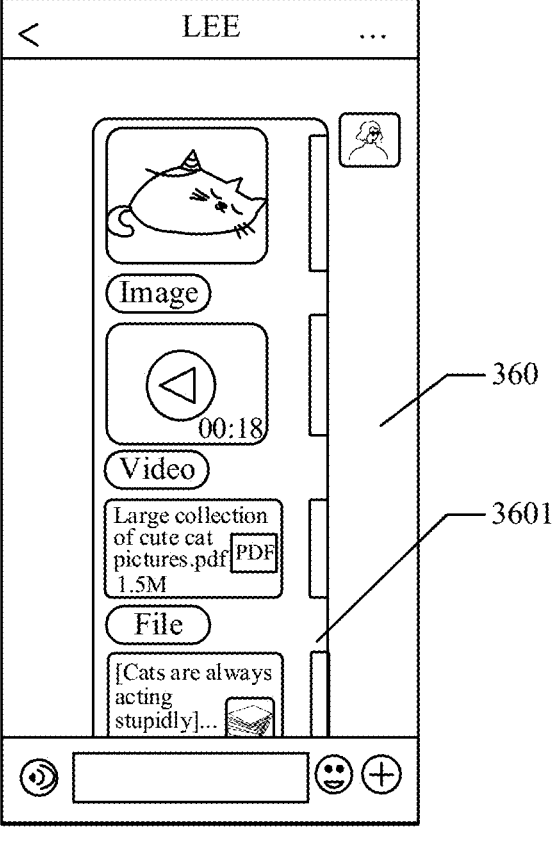
FIG. 3f is a schematic diagram of an effect of aggregation sharing according to an embodiment of the present disclosure.

The N sharing target multimedia materials may be classified and sorted based on the categories, and target multimedia materials of a same categories are aggregated into one category for sharing. Aggregation sharing is a manner of merging sharing. Through merging sharing, various multimedia materials may be classified and sorted into a small quantity of conversation messages. For example, target multimedia materials of each category in a plurality of categories are collected and displayed in a same conversation message. For example, a picture set, a video set, and a file set are displayed in a conversation message A. Exemplarily, FIG. 3f is a schematic diagram of an effect of aggregation sharing according to an embodiment of the present disclosure. In an aggregation sharing interface, a selected picture, video, file, and link are all sorted in a conversation message 3601 in a conversation interface 360, and multimedia materials of a same category are presented in a fixed area of the conversation message.

It may be seen that, by sorting the multimedia materials of the same category into the small quantity of conversation messages based on the categories, all target multimedia materials under a category can be displayed in a same area of the conversation message, which reduces a browsing height of overall information, and enables quickly viewing shared material content of a same category.

When multimedia materials of a category are included in the aggregation sharing interface, a selected target multimedia material only belongs to the category. In this case, aggregation sharing may be performed on selected N target multimedia materials through one conversation message, and general information of the target multimedia materials of the category may be intuitively viewed in an interface that presents the conversation message.

According to the social network application data processing solution provided in the embodiment of the present disclosure, selectable multimedia materials of different categories may be provided for a sharer through an aggregation sharing interface, and any multimedia material may be selected as a sharing target multimedia material in the aggregation sharing interface, implementing a one-stop convenient selection operation. The multimedia materials of different categories can be shared with another conversation object at once, which is very simple and convenient, and greatly improves efficiency of a conversation object sharing multimedia content information of multiple categories. When selected multimedia materials are very complex, the selected multimedia materials may be classified and sorted based on categories and then shared with a target sharing object. For example, the multimedia materials are sorted into a same conversation message, instead of being respectively displayed through a plurality of conversation messages, so that a display height of overall information is reduced. Whether for a terminal device of a conversation object sharing the multimedia material or for a terminal device of a shared conversation object, less screen space may be occupied to display more multimedia material content, which improves efficiency of displaying multimedia material content, and additionally improves utilization of screen space of a terminal device, thereby greatly improving efficiency of the conversation object in a human-computer interaction operation such as sharing and viewing complex information.

Based on this, the target multimedia material may be selected through a material selection area provided in the aggregation sharing interface, and the selected target multimedia material is presented in a material preview area, so that when needing to operate the target multimedia material, the sharer can perform centralized viewing more conveniently and perform selection more conveniently. In some embodiments, the aggregation sharing interface may be entered with one click through an aggregation sharing portal in a social conversation interface, and can be displayed without performing a very complicated operation, to quickly activate a selection interface (namely, the aggregation sharing interface) for sharing the multimedia material. In this way, operations are reduced, human-computer interaction efficiency is improved, and processing efficiency of the terminal device is further improved.

Figure 4:
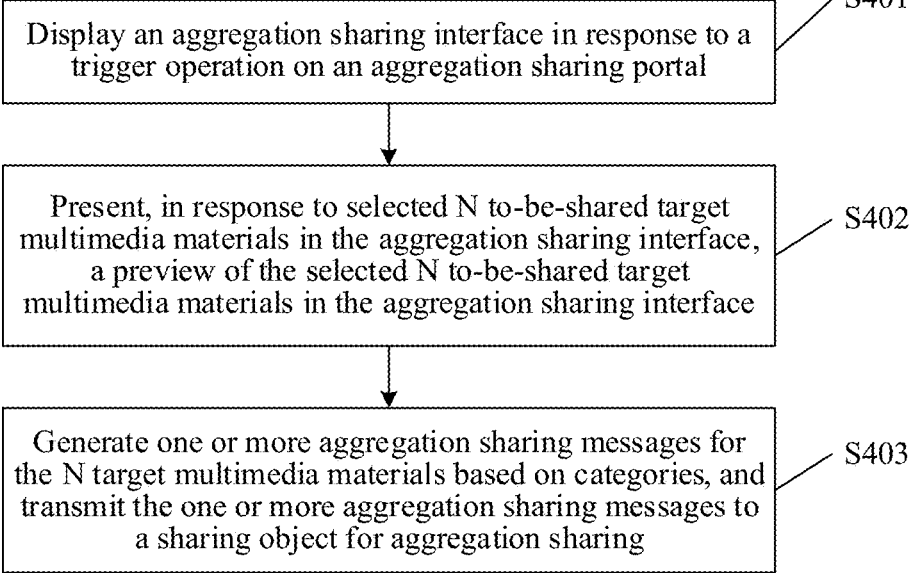
FIG. 4 is a schematic flowchart of a social network application data processing method according to some exemplary embodiments of the present disclosure.

FIG. 4 is a schematic flowchart of a social network application data processing method according to an exemplary embodiment of the present disclosure. The social network application data processing method may be performed by a computer device (for example, the first terminal 100a in FIG. 1), a social network application client runs in the computer device, and the social network application data processing method may include the following content.

S401: Display an aggregation sharing interface in response to a trigger operation on an aggregation sharing portal.

In some embodiments, a material selection area is provided in the aggregation sharing interface; and multimedia materials of multiple categories are displayed in the material selection area. That is to say, the aggregation sharing interface is divided into the material selection area for displaying the multimedia materials of multiple categories. In addition, the multimedia materials displayed in the material selection area are also selectable.

In some embodiments, a process of displaying the multimedia materials of multiple categories in the material selection area includes any one of the following: ① displaying by category in the material selection area based on the categories of the multimedia materials; ② displaying, when the multimedia materials of multiple categories are sourced from one or more social conversations, in partitions in the material selection area based on sources of the multimedia materials, where different partitions correspond to multimedia materials from different social conversations;

and ③ for multimedia materials from a same social conversation when the multimedia materials of multiple categories are sourced from one or more social conversations, displaying in chronological order in the material selection area based on transmitting time of the multimedia materials in the social conversation.

Specifically, the multimedia materials may be displayed in the material selection area by category. For example, if the multimedia materials include three categories, the three categories may be set in the material selection area and corresponding multimedia materials are displayed under the categories. For another example, a preset category may be displayed in the material selection area, and under a category to which a multimedia material belongs, the multimedia material is correspondingly displayed. For example, there are five preset categories, but the multimedia materials only cover three categories. In other words, there may not be a corresponding multimedia material under a corresponding category. For example, an image category of the aggregation sharing interface includes an image material, a video category includes a video material, while a multimedia material under another category is empty. Exemplarily, in a material selection area shown in FIG. 5a, a multimedia material of the image category, namely, the image material, is displayed in a material selection area 5101 of the aggregation sharing interface. A multimedia material of another category, such as a video, music, a mini program, or a file may be further switched to be displayed in the material selection area 5101. In this way, displaying multimedia materials by category in the material selection area 5101 may be implemented.

The multimedia material displayed in the aggregation sharing interface may be sourced from the social conversation, and the social conversation may be a personal conversation in which a sharer is located or a group conversation. For example, the social conversation may be a personal conversation between a conversation object A (namely, the sharer) and a conversation object B, or may be a group conversation in which the conversation object A participates. Specifically, the multimedia material displayed in the aggregation sharing interface may be sourced from a historical conversation message generated in the one or more social conversations. Because the historical conversation message includes multimedia content information (for example, an image), the multimedia content information may be used as the multimedia material.

Under a condition that the multimedia materials of multiple categories included in the aggregation sharing interface are sourced from the one or more social conversations, the following two display manners are included: one is the displaying in partitions in the material selection area based on sources of the multimedia materials, and the other is the displaying in chronological order in the material selection area based on transmitting time of the multimedia materials in the social conversation.

Figures 5A, 5B:
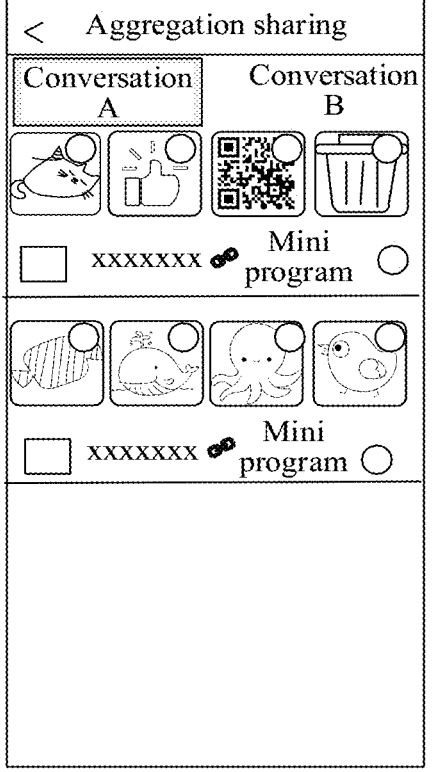
FIG. 5a is a schematic interface diagram of an interface of a material selection area according to some exemplary embodiments of the present disclosure.
FIG. 5b is a schematic diagram of displaying multimedia materials in partitions in a material selection area according to some exemplary embodiments of the present disclosure.

Multimedia materials sourced from different social conversations may be displayed in partitions in the material selection area, and different partitions correspond to the multimedia materials from different social conversations. If the multimedia materials are sourced from one social conversation, one partition is used for displaying the multimedia materials sourced from the social conversation; and if the multimedia materials are sourced from more social conversations, different social conversations may be switched for displaying in partitions. Exemplarily, as shown in FIG. 5b, a current material selection area displays all multimedia materials from a conversation A, and when switched to a conversation B, the current material selection area may display a multimedia material from the conversation B.

Figure 5C:
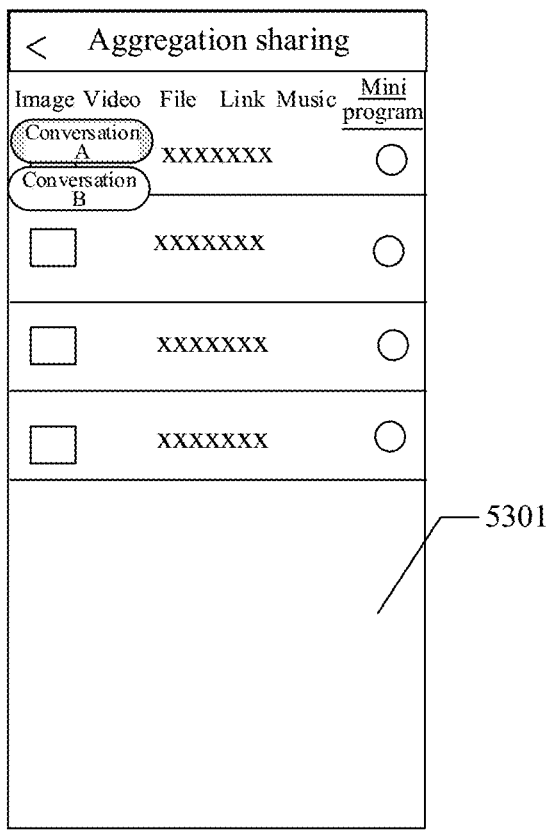
FIG. 5c is a schematic diagram of displaying multimedia materials in partitions and by category in a material selection area according to some exemplary embodiments of the present disclosure.

When the multimedia materials of multiple categories are displayed in partitions in the material selection area based on the sources, for multimedia materials from a same social conversation, displaying in order based on transmitting time in the social conversation, displaying in random order, or displaying by category based on categories may be performed. If the multimedia materials from the same social conversation are displayed by category based on the categories, in this manner, a source of the multimedia material may be used as a first-level view tag, and a category of the multimedia material may be used as a second-level view tag. Based on these two view tags, the multimedia material can be conveniently viewed or searched in the aggregation sharing interface, and a possibility of sharing the multimedia materials from different social conversations at once is provided. Exemplarily, a material selection area 5301 of an aggregation sharing interface shown in FIG. 5c displays a mini program from the conversation A. After the aggregation sharing interface is switched to the conversation B, for a multimedia material under a mini program category, a mini program from the conversation B is displayed. Further, multimedia materials from a same category may be displayed in chronological order in the material selection area based on transmitting time in the social conversation.

Figure 5D:
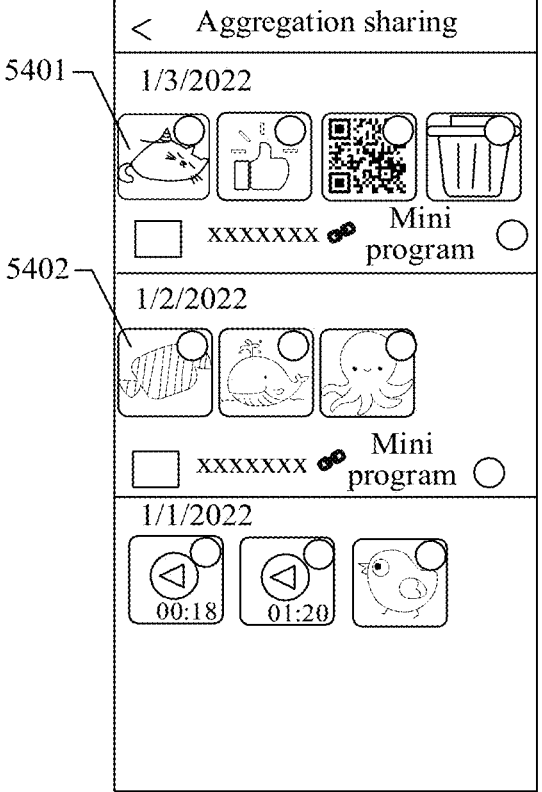
FIG. 5d is a schematic diagram of displaying multimedia materials in chronological order in a material selection area according to some exemplary embodiments of the present disclosure.

Multimedia materials sourced from one or more social conversations may be displayed in chronological order in the material selection area based on the transmitting time in the social conversation, and in this case, multimedia materials sourced from different social conversations are mixed together to be displayed. In other words, multimedia materials of different categories and from different social conversations may be cross-displayed. Exemplarily, a material selection area shown in FIG. 5d presents multimedia materials of different categories based on dates. If transmitting time of a picture 5401 in the conversation A is earlier than transmitting time of a picture 5402 in the conversation B, the picture 5402 may be displayed in front of the picture 5401. In other words, a latest picture is displayed at the front.

In this manner, when multimedia materials are sourced from one or more social conversations, multimedia materials of multiple categories are arranged in an order of transmitting time (for example, dates), instead of being differentiated based on categories of the multimedia materials. Displaying in chronological order of transmitting time helps the sharer quickly find latest multimedia materials from different social conversations, to quickly select when needing to share the multimedia material, reduce time for searching and selecting, and improve human-computer interaction efficiency.

S402: Present, in response to selected N sharing target multimedia materials in the aggregation sharing interface, a preview of the selected N sharing target multimedia materials in the aggregation sharing interface.

In some embodiments, the N sharing target multimedia materials may be selected in the material selection area of the aggregation sharing interface. Further, the selected target multimedia material and an unselected multimedia material are displayed differently in the material selection area, where the displaying differently includes any one of the following: displaying differently through different colors, displaying differently through different statuses, and displaying differently through different locations.

A selected multimedia material in the material selection area is the target multimedia material. For ease of marking selection of the multimedia material, the target multimedia material and the unselected multimedia material may be displayed differently in different manners: displayed differently through different colors, where for example, the selected target multimedia material is marked as transparent gray, while the unselected multimedia material is marked as white; displayed differently through different statuses, where for example, the selected target multimedia material is indicated by a status icon as being in a checked state, while the unselected multimedia material is in an unchecked state; and displayed differently through different locations, where for example, the selected target multimedia material is displayed at the front, while the unselected multimedia material is displayed at the back. Exemplarily, the manner of displaying differently through different statuses is used as an example, and reference may be made to the schematic diagram of effect of displaying different through being checked or unchecked in the material selection area in the aggregation sharing interface shown in the foregoing FIG. 3e.

Based on the different display manners of the multimedia material in the material selection area and content required by the sharer, efficiency of selecting the target multimedia material is also to be different. The following is described by using a manner in which the multimedia materials are displayed by category in the material selection area based on the categories as an example. Through the aggregation sharing interface, the multimedia materials may be sorted based on categories such as a picture, a video, a file, a link, music, and a mini program. In this way, multimedia materials of different categories are not mixed together, to enable the sharer to quickly and easily find and select multimedia materials of multiple categories to be shared based on the categories. Especially when a plurality of multimedia materials of different categories need to be simultaneously shared, searching efficiency of selecting multimedia materials to be shared may be improved and time spent on selection is reduced. Multimedia materials under a same category may also be presented based on transmitting time in a social conversation. Therefore, in addition to a category dimension, the multimedia material may also be searched and selected from a dimension of a message transmitting order, and searching efficiency may be further improved by integrating a plurality of dimensions.

Previewing the selected target multimedia material in the aggregation sharing interface may be previewing in real time during selecting the target multimedia material. In other words, whenever a target multimedia material is selected, the target multimedia material may be previewed in the aggregation sharing interface. Alternatively, previewing may be performed after selecting of the target multimedia material is completed. In other words, N (for example, three) target multimedia materials are uniformly previewed after being selected. For example, after selection is completed in the material selection area, a confirmation option is tapped to display the material preview area. Regardless of the manner, to preview N target multimedia materials in the aggregation sharing interface, the selected target multimedia materials may be collectively presented in the aggregation sharing interface. This makes it convenient for the sharer to view content of the selected target multimedia material at a glance, and perform a convenient operation (such as a viewing or deleting operation) on the collectively presented target multimedia materials. In some embodiments, the material preview area is provided in the aggregation sharing interface. Specifically, the selected N sharing target multimedia materials may be displayed in the material preview area. In other words, the selected N sharing target multimedia materials are displayed in the material preview area. The aggregation sharing interface is divided into the material preview area for displaying the target multimedia materials in a centralized manner, for ease of viewing and operating the target multimedia materials.

In an implementation, a process of displaying the N target multimedia materials in the material preview area includes any one of the following: ① displaying the N target multimedia materials by category in the material preview area based on the category; ② displaying in chronological order based on selected time of the N target multimedia materials; ③ and displaying the N target multimedia materials in random order.

Figure 5E:
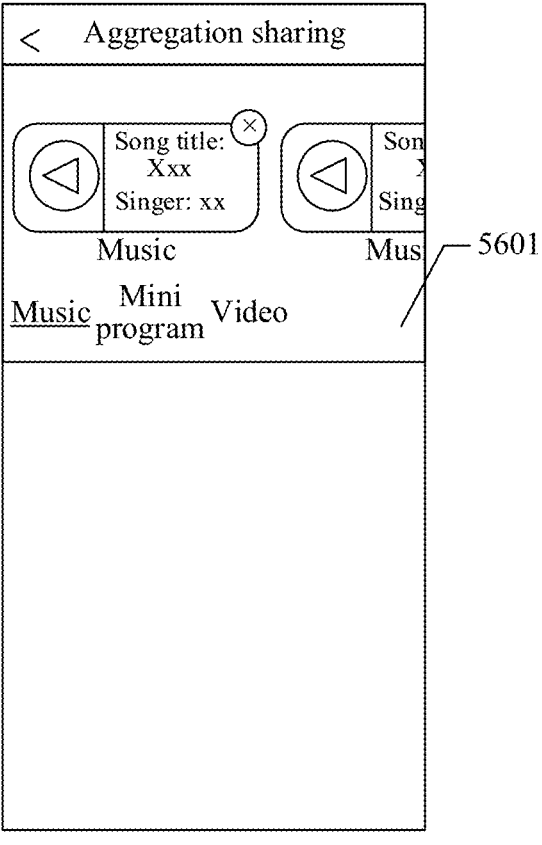
FIG. 5e is a schematic diagram of displaying a target multimedia material in a material preview area according to some exemplary embodiments of the present disclosure.

For a display manner ①: the N target multimedia materials are multimedia materials selected in the multimedia materials of multiple categories, and because categories to which the N target multimedia materials belong include at least one category, by presenting target multimedia materials of corresponding categories in the material preview area in a centralized manner, the selected target multimedia materials can be quickly viewed based on the categories. For example, if the N target multimedia materials includes target multimedia materials of three categories, which are an image, a video, and a mini program respectively, the target multimedia materials may be presented by category in the material preview area based on the three categories. Exemplarily, a material preview area is shown in FIG. 5e. In a material preview area 5601 in an aggregation sharing interface, a music material is currently presented and may be switched to a multimedia material of another category (for example, a video or mini program) through an operation.

Figure 5F:
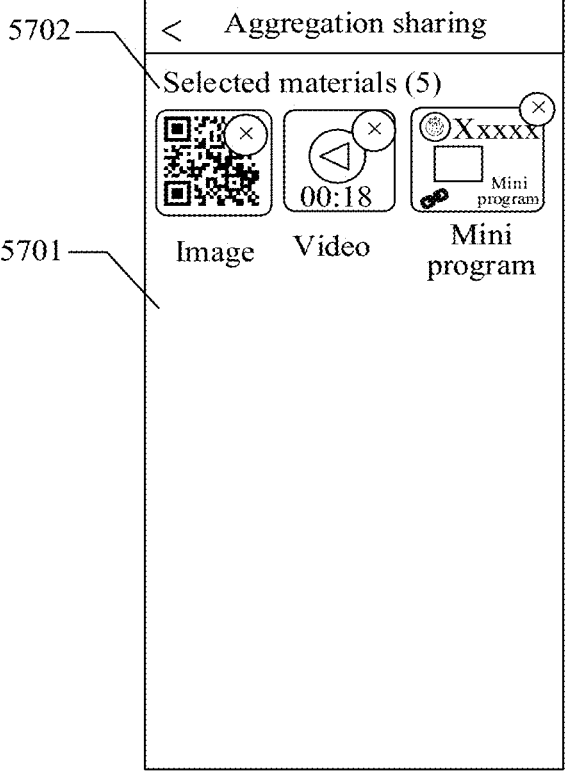
FIG. 5f is another schematic diagram of displaying a target multimedia material in a material preview area according to some exemplary embodiments of the present disclosure.

For a display manner ②, there is an order of time when the N target multimedia materials are selected in the aggregation sharing interface. The target multimedia materials are displayed sequentially in chronological order based on selected time in the material preview area. For example, the target multimedia materials displayed in a material preview area 5701 shown in FIG. 5f in chronological order include an image, a mini program, and a video, and in this case, the target multimedia materials of various categories are cross-mixed. In addition, the material preview area further displays statistical information 5702 about a quantity of the selected target multimedia materials.

In addition to the foregoing two display manners, the N target multimedia materials may also be randomly displayed in the material preview area. Randomness of an order of the target multimedia materials may bring an unexpected search experience to the sharer. In some embodiments, due to a limitation of the material preview area, when a display area required for a plurality of target multimedia materials exceeds the material preview area, some multimedia materials may be hidden in chronological order based on selected time, to ensure that a latest selected target multimedia material may be displayed in the material preview area first, to visually view a recently selected target multimedia material. It is also very convenient when a related operation is required to be performed on the target multimedia material after selection.

In some embodiments, the material preview area may further display statistical information about a quantity of the selected target multimedia materials. The statistical information about the quantity may prompt the sharer of a quantity of all target multimedia materials currently selected. In addition, under each target multimedia material presented in the material preview area, a category to which the target multimedia material belongs may also be displayed, thereby improving interaction experience.

S403: Generate one or more aggregation sharing messages for the N target multimedia materials based on the categories, and transmit the one or more aggregation sharing messages to a sharing object for aggregation sharing.

For this step, reference may be made to the description in the foregoing embodiment. Details are not described herein again.

According to the social network application data processing solution provided in the embodiment of the present disclosure, a material selection area may be provided in an aggregation sharing interface, and multimedia materials of multiple categories are displayed in the material selection area in a corresponding display manner. Through the aggregation sharing interface, multimedia materials of different categories are sorted. For example, the multimedia materials are sorted based on categories/sources/transmitting time. Sorting the multimedia materials helps a sharer to quickly find and select, in a sorting manner, for example, based on a category, a multimedia material needed to be shared, and human-computer interaction efficiency is high, thereby improving processing efficiency of a device. Likewise, a target multimedia material displayed in the material preview area provided in the aggregation sharing interface may also be displayed in a corresponding display manner, so that a target multimedia material required to be operated may be accurately and quickly positioned for performing an operation (such as deletion), which improves processing efficiency of the target multimedia material and human-computer interaction efficiency.

Figure 6:
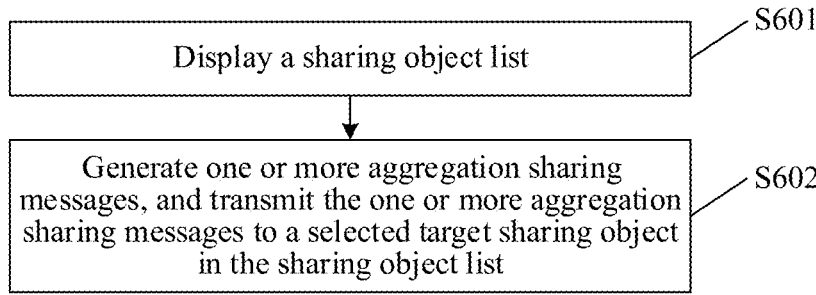
FIG. 6 is a schematic flowchart of a social network application data processing method according to some exemplary embodiments of the present disclosure.

FIG. 6 is a schematic flowchart of a social network application data processing method according to an exemplary embodiment of the present disclosure. The social network application data processing method may be performed by a computer device (for example, the first terminal 100a in FIG. 1), a social network application client runs in the computer device, and the social network application data processing method may include the following content. This embodiment specifically describes in detail the manner of "generating one or more aggregation sharing messages for the N target multimedia materials based on the categories, and transmitting the one or more aggregation sharing messages to a sharing object for aggregation sharing" in the foregoing embodiment. Other content may be the same as the foregoing embodiment. Details are not described herein again.

S601: Display a sharing object list.

The sharing object list includes one or more sharing objects, and the sharing object may be a single conversation object, or may be a conversation group, or may be another application program. In some embodiments, S601 may be performed by: displaying the sharing object list in response to a sharing operation initiated in an aggregation sharing interface. In response to the sharing operation, a terminal may display the sharing object list through a pop-up box in the aggregation sharing interface, or jump to a new interface to display the sharing object list. In this embodiment of the present disclosure, "in response to" is a response made by the terminal when there is a processing request. The processing request may be a sharing request, a viewing request, a switching viewing request, or the like for a multimedia material. In response to (a stated condition or event), the terminal may perform an action required for processing.

In some embodiments, the sharing operation is any one of the following: a preset gesture operation, a trigger operation for a sharing control, and a voice control operation. The preset gesture operation is, for example, sliding upward, and the voice control operation is, for example, "sharing" voice input after a sharer completes selecting the multimedia material. In some embodiments, the sharing control is a functional control set in the aggregation sharing interface, and the trigger operation for the sharing control is, for example, tapping the sharing control in the aggregation sharing interface. When one or more multimedia materials in the aggregation sharing interface are selected, the sharing control in the aggregation sharing interface is in an activated state. In other words, the sharing control may be operated (for example, tapped). When any multimedia material in the aggregation sharing interface is not selected, the sharing control in the aggregation sharing interface is in an inactive state, and in this case, the sharing control cannot be operated. This setting can prevent, when there is no sharing target multimedia material, the sharing control from being accidentally triggered and consuming a resource to perform aggregation sharing.

In some embodiments, there are one or more sharing controls set in the aggregation sharing interface. When one sharing control is set in the aggregation sharing interface, the sharing control is triggered and a sharing manner may be selected. The sharing manner includes aggregation sharing and sharing one by one. The manner of aggregation sharing may be performed based on content of this embodiment of the present disclosure. For example, N target multimedia materials of M categories mentioned below may be aggregated into P aggregation sharing messages to be sent to a target sharing object. In the manner of sharing one by one, N target multimedia materials may be processed one by one into N conversation messages to be sent to a target sharing object. When more sharing controls, specifically including a one-by-one sharing control and an aggregation sharing control, are set in the aggregation sharing interface, if the one-by-one sharing control is triggered, N target multimedia materials may be shared one by one in N conversation messages to a target sharing object, and if the aggregation sharing control is triggered, an aggregation manner may be further selected, including being aggregated into one aggregation sharing message and being aggregated into a plurality of aggregation sharing messages.

Figure 7A:
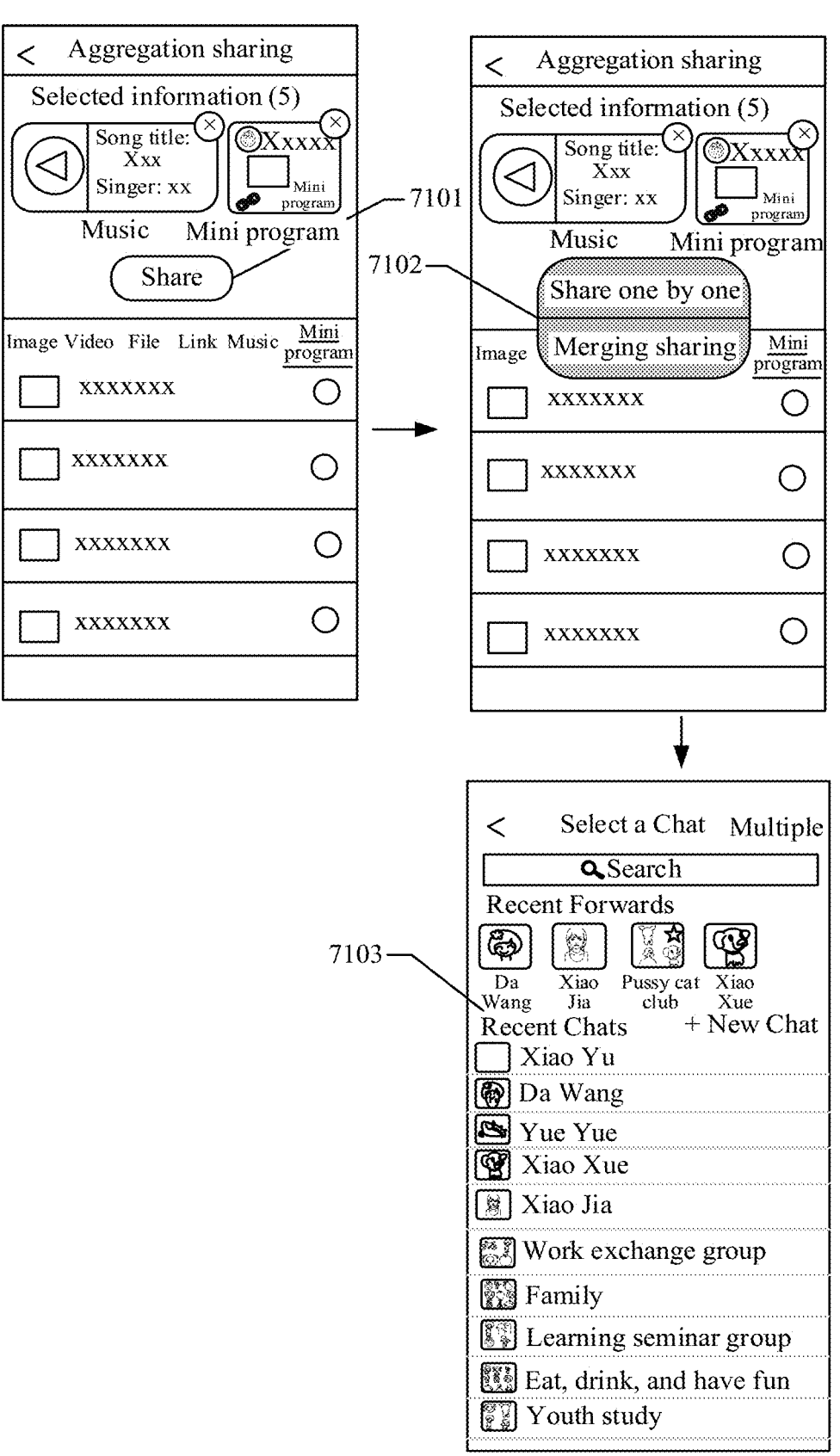
FIG. 7a and FIG. 7b are schematic diagrams of a setting effect of a sharing control according to some exemplary embodiments of the present disclosure.
Figure 7B:
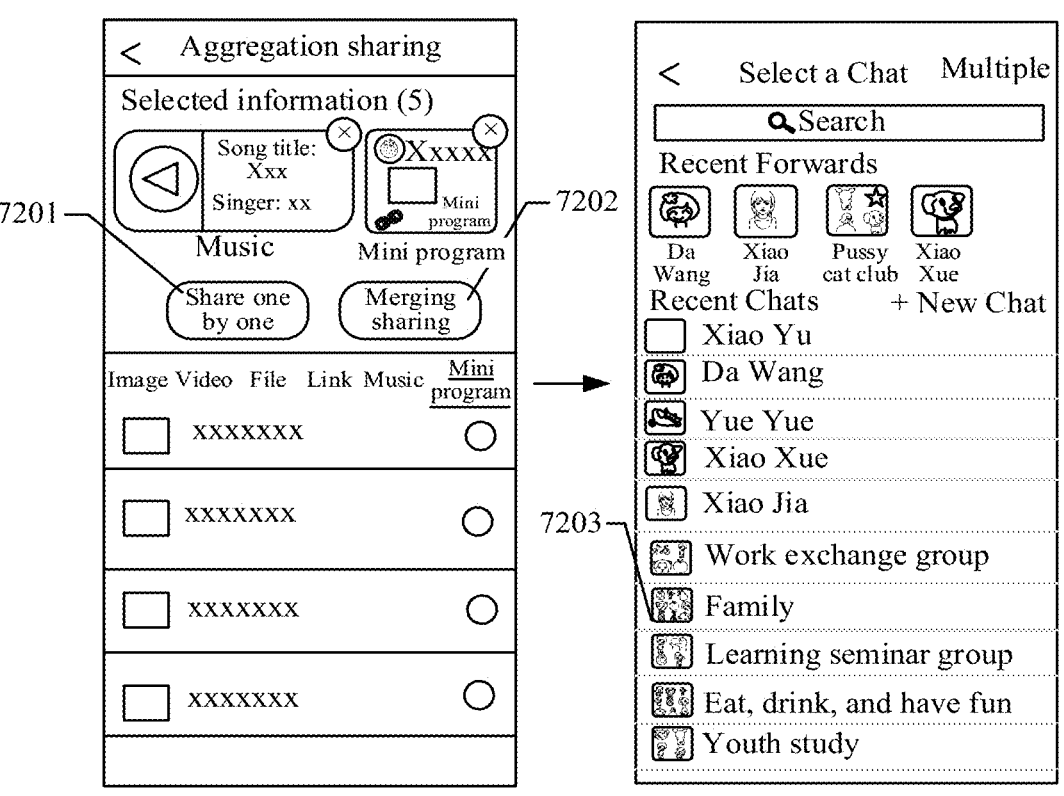

Exemplarily, for a schematic diagram of an operation of triggering the sharing control to display the sharing object list, reference may be made to FIG. 7a and FIG. 7b. As shown in FIG. 7a, a sharing control 7102 is set in the aggregation sharing interface. When the sharing control 7102 is tapped, a pop-up window 7101 may be further displayed, and a sharing manner is selected in the pop-up window. When any sharing manner is selected, a sharing object list 7103 may be displayed. As shown in FIG. 7b, more sharing controls including a one-by-one sharing control 7201 and a merging sharing control 7202 are set in the aggregation sharing interface. When any sharing control is tapped, a sharing object list 7203 may be displayed. If content described in S602 in this embodiment is performed, the merging sharing manner may be selected (for example, merging sharing is selected in the pop-up window 7101 or the merging sharing control 7202 is directly selected) to achieve a final effect of aggregation sharing.

In addition, processes of sharing one by one and aggregation sharing may also be triggered through different preset gesture operations. For example, sliding up with one finger on the aggregation sharing interface may trigger displaying the sharing object list and transmitting N target multimedia materials one by one to a selected target sharing object, and N conversation messages may be displayed in a target conversation interface of a conversation with the target sharing object. Sliding up with a plurality of fingers on the aggregation sharing interface may trigger displaying the sharing object list and performing aggregation sharing based on the content introduced in S602 below.

S602: Generate one or more aggregation sharing messages, and transmit the one or more aggregation sharing messages to a target sharing object selected in the sharing object list.

The target sharing object is a sharing object selected in the sharing object list, and the target sharing object may be a single conversation object, or may be a conversation group, or may be another application program. In some embodiments, the one or more aggregation sharing messages are obtained by aggregating the N target multimedia materials based on the categories. The aggregation sharing message may be a conversation message that aggregates target multimedia materials of at least one category.

Figure 7C:
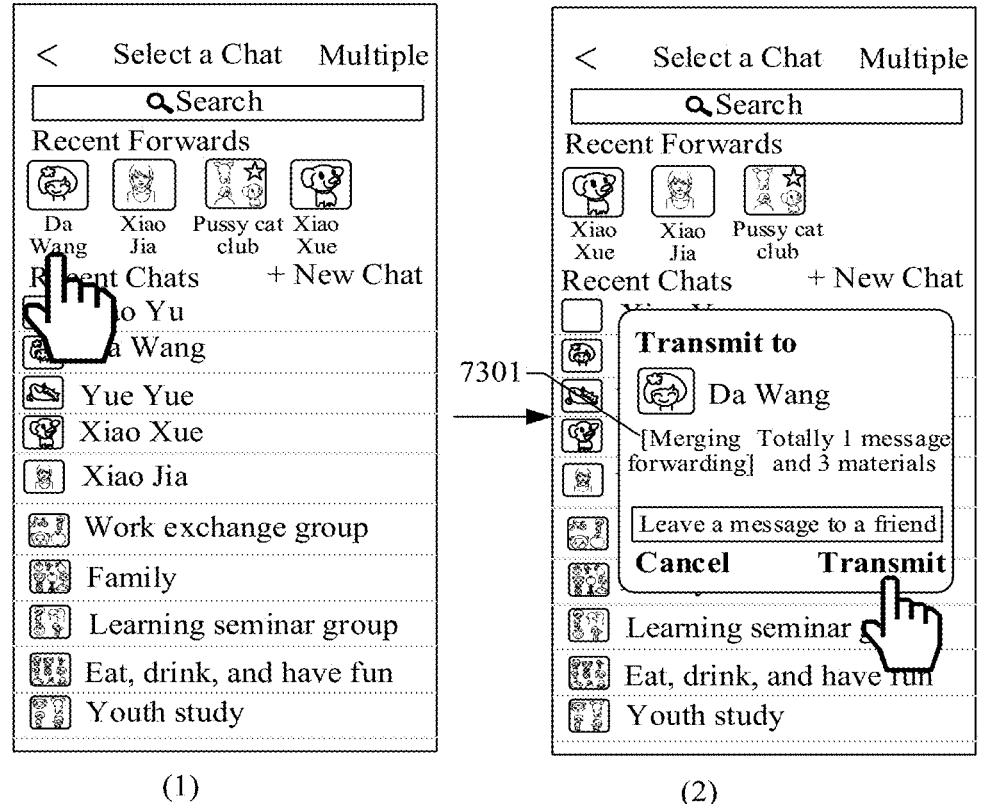
FIG. 7c is a schematic diagram of an operation of aggregation sharing according to some exemplary embodiments of the present disclosure.

Exemplarily, in a schematic diagram of an operation of aggregation sharing shown in FIG. 7c, after a target sharing object is selected in a sharing object list, sharing confirmation information 7301 is displayed. The sharing confirmation information includes the target sharing object, a sharing manner, and processing information of a multimedia material in the sharing manner. Herein the processing information is specifically aggregation information obtained through aggregation of target multimedia materials in a merging sharing manner. After a transmit option is tapped, an aggregation sharing message can be transmitted to the target sharing object "Da Wang".

In some embodiments, the N target multimedia materials are clustered into M categories, where M is a positive integer; and the N target multimedia materials are aggregated into P aggregation sharing messages based on the categories, where P is less than or equal to M. Among the N target multimedia materials, one or more target multimedia materials belonging to one category are clustered together, thereby forming the M categories corresponding to the N target multimedia materials. The target multimedia materials of M categories may be further aggregated into P aggregation sharing messages, and target multimedia materials of one or more categories among the M categories may be aggregated in each aggregation sharing message. For example, ten target multimedia materials may be clustered into three categories. After aggregation is performed based on the categories, three aggregation sharing messages or two conversation messages are obtained.

In other words, the target multimedia materials of M categories may be aggregated into P aggregation sharing messages based on the categories. Aggregation under different aggregation results may be classified into the following two examples: ① when P=M, target multimedia materials of one category are aggregated into one aggregation sharing message, and target multimedia materials of different categories are aggregated into different aggregation sharing messages. In other words, M aggregation sharing messages may be obtained by aggregating the target multimedia materials of M categories, only target multimedia materials of one category are aggregated in each aggregation sharing message, and categories of target multimedia materials aggregated in each aggregation sharing message are different. ② When P<M, target multimedia materials of one or more categories are aggregated into a same aggregation sharing message. In other words, P aggregation sharing messages may be obtained by aggregating the target multimedia materials of M categories, where P is less than M, and target multimedia materials of at least one category may be aggregated in one aggregation sharing message. For example, target multimedia materials of three categories may be aggregated into two aggregation sharing messages. One aggregation sharing message aggregates target multimedia materials of one category, and the other aggregation sharing message aggregates target multimedia materials of two categories.

In some embodiments, after the aggregation sharing message is transmitted to the target sharing object, an interface effect presented may be: displaying a target conversation interface between the sharer and the target sharing object; and displaying one or more aggregation sharing messages in the target conversation interface. By using an example in which the target sharing object is a conversation object A, the target multimedia material in the aggregation sharing message may be from a historical conversation message between the sharer and the conversation object A, or from a historical conversation message between the sharer and a conversation object B. Because target multimedia materials of a category are aggregated and displayed in an aggregation sharing message, rather than the target multimedia materials of a category being expanded and displayed in an aggregation sharing message, a browsing height of the target multimedia material in the aggregation sharing message displayed in the target conversation interface may be greatly reduced.

Figure 7D:
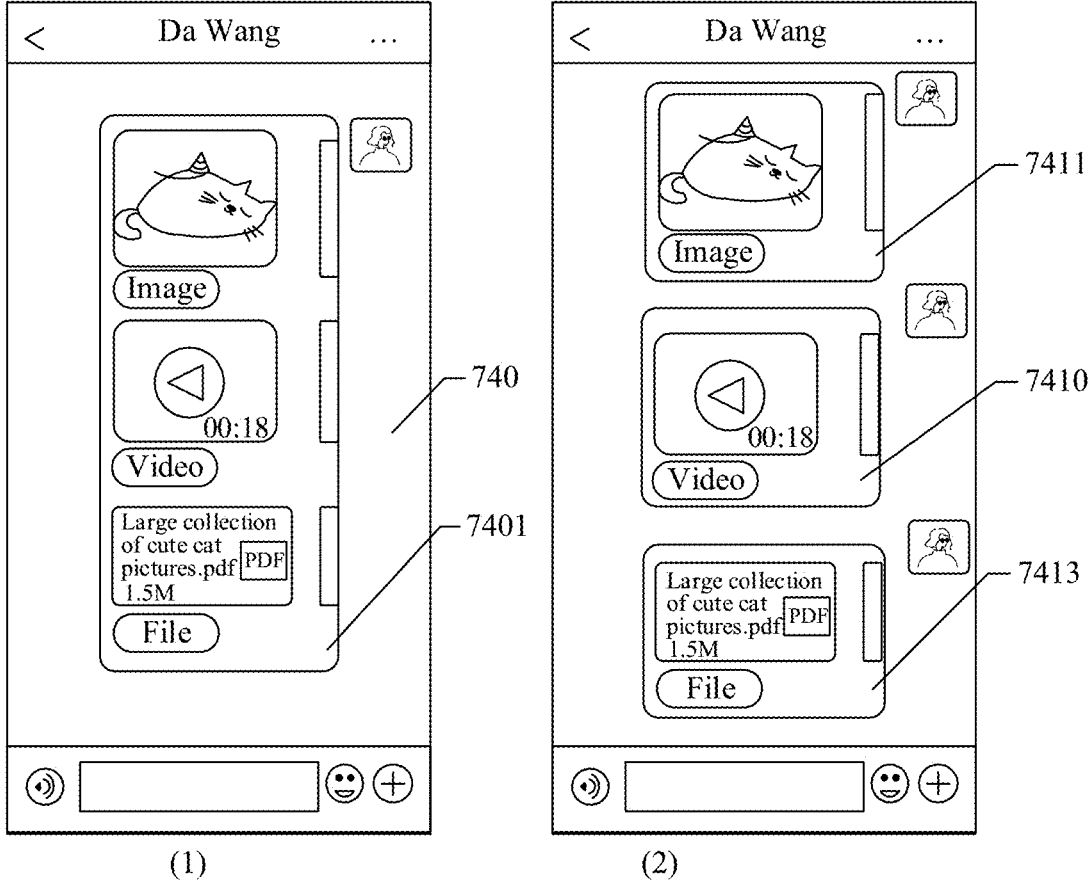
FIG. 7d is a schematic diagram of an effect of an aggregation sharing message according to some exemplary embodiments of the present disclosure.

Exemplarily, FIG. 7d is a schematic diagram of an effect of an aggregation sharing message according to an embodiment of the present disclosure. As shown in (1) in FIG. 7d, an aggregation sharing message 7401 is displayed in a target conversation interface 740, and the aggregation sharing message includes a set of multimedia materials of categories of a picture, a video, and a file. As shown in (2) in FIG. 7d, three aggregation sharing messages are displayed in the target conversation interface. Each aggregation sharing message includes multimedia materials of a category, where respectively, an aggregation sharing message 7410 includes a set of picture materials, an aggregation sharing message 7411 includes a set of video materials, and an aggregation sharing message 7413 includes a set of file materials.

Figure 7E:
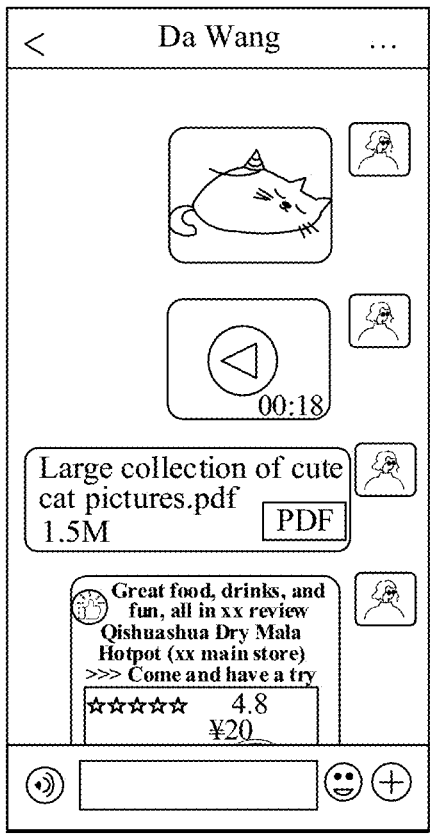
FIG. 7e is a schematic diagram of an effect of sharing one by one according to some exemplary embodiments of the present disclosure.

The N target multimedia materials may also not be aggregated based on the categories. One target multimedia material is transmitted to the target sharing object through a conversation message. In other words, the N target multimedia materials are transmitted one by one in N conversation messages. In this way, the N conversation messages are displayed in the target conversation interface, and each conversation message includes a target multimedia material. That is to say, when the target multimedia material is selected in the aggregation sharing interface to be transmitted to any target sharing object, the target multimedia materials are forwarded one by one with a display effect of a plurality of messages transmitted in sequence. Exemplarily, reference may be made to a schematic diagram of an effect of sharing one by one shown in FIG. 7e.

In some embodiments, aggregation of the N target multimedia materials based on the categories may be performed by a server or by a social network application client running in a terminal. The terminal may transmit one or more aggregation sharing messages obtained through aggregation to the target sharing object through the server. Specifically, when the aggregation is performed by the server, the target sharing object is selected in the sharing object list, and after sharing is confirmed, a sharing request may be transmitted to the server. The sharing request carries an identification of the target multimedia material and an identification of the target sharing object. The server aggregates the selected target multimedia materials into P aggregation sharing messages based on the identification of the target multimedia material, and transmits the P aggregation sharing messages to the corresponding target sharing object based on the identification of the target sharing object. The P aggregation sharing messages may also be displayed in the target conversation interface.

In some embodiments, each aggregation sharing message includes a display area, and target multimedia materials of a same category are displayed in a same display area in a same aggregation sharing message; and when an aggregation sharing message includes target multimedia materials of multiple categories, target multimedia materials of a same category are displayed in a same display area in the aggregation sharing message, and target multimedia materials of different categories are displayed in different display areas in the aggregation sharing message.

One display area is configured for displaying target multimedia materials of one category. Based on different aggregation results of the N target multimedia materials, the aggregation sharing message may include one or more display areas. When N target multimedia materials of M categories are aggregated into M aggregation sharing messages, because one aggregation sharing message aggregates only target multimedia materials of one category, one aggregation sharing message includes a display area for displaying the target multimedia materials of the category. When the N target multimedia materials of M categories are aggregated into P (P<M) aggregation sharing messages, because one aggregation sharing message may aggregate target multimedia materials of one or more categories, one aggregation sharing message may include one or more display areas for displaying the target multimedia materials of a corresponding category. When P=1, one aggregation sharing message includes M display areas, target multimedia materials of a corresponding category are displayed in each display area, and target multimedia materials of different categories are displayed in different display areas. When P≠1, some aggregation sharing messages may include one display area, and some aggregation sharing messages may include a plurality of display areas. The target multimedia materials displayed in the display areas belong to different categories.

Figure 7F:
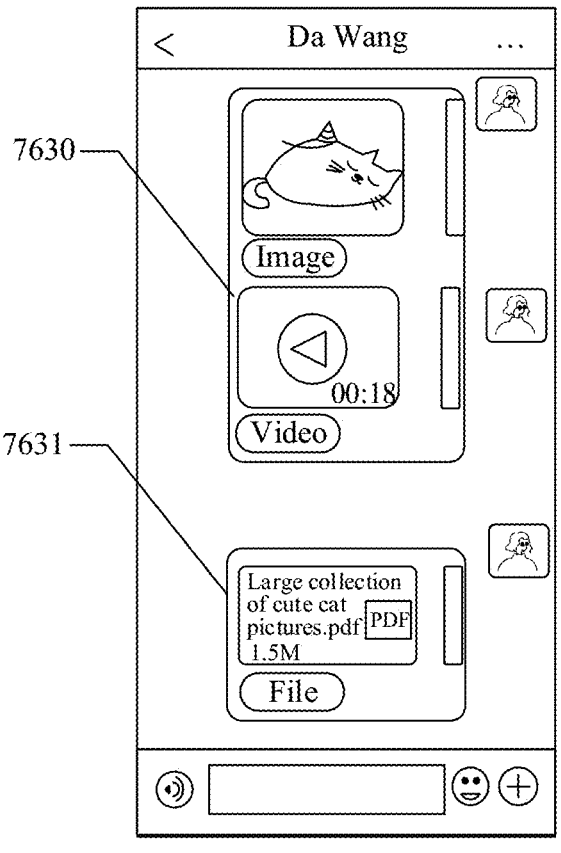
FIG. 7f is a schematic diagram of an effect of another aggregation sharing message according to some exemplary embodiments of the present disclosure.

Exemplarily, FIG. 7f is a schematic diagram of an effect of another aggregation sharing message according to an embodiment of the present disclosure. As shown in FIG. 7f, there are two aggregation sharing messages, respectively an aggregation sharing message 7630 and an aggregation sharing message 7631, displayed in a target conversation interface. The aggregation sharing message 7631 includes a display area, and the display area displays materials of a file category. The aggregation sharing message 7630 includes two display areas, one display area displays a picture material, and the other display area displays a video material. For content presented in the display area under another manner of aggregation processing, reference may be made to the content shown in the foregoing FIG. 7d. Each target multimedia material is also displayed in a corresponding display area.

It may be seen that, by setting of the display area in the conversation message, target multimedia materials of a same category may be presented in a same area. In other words, the target multimedia materials of the same category only need to be displayed at one height. An overall browsing height is calculated by using the category of the target multimedia material as a unit, instead of a quantity of target multimedia materials, so that a browsing height of the aggregation sharing message can be greatly reduced.

In some embodiments, the target multimedia material is displayed in a thumbnail manner based on a preset proportion in the display area of the aggregation sharing message; and mark information corresponding to the target multimedia material is displayed at a preset location of the aggregation sharing message, where the mark information includes at least one of the following: a category, a source, a size, and duration.

The preset proportion is a proportion set by scaling based on an original proportion of the target multimedia material. That is to say, the target multimedia material is not displayed at the original proportion in the display area, but is scaled down and presented in the display area based on the original proportion. The preset location of the aggregation sharing message may be below the target multimedia material. For each target multimedia material, displaying the corresponding mark information may roughly present information about the target multimedia material. For example, for the target multimedia materials displayed in the display area shown in FIG. 7d or FIG. 7f, under each target multimedia material, a category to which the target multimedia material belongs is displayed. By abbreviating and displaying the target multimedia material in the display area based on the preset proportion, while ensuring that the target multimedia material is clearly presented, display space occupied by the target multimedia material can be reduced as much as possible, further reducing a browsing height of the target multimedia material, for ease of viewing.

To ensure beautiful display of the aggregation sharing message, in some embodiments, thumbnail widths of target multimedia materials of different categories in each display area are the same, and thumbnail heights of multimedia materials of a same category in a same display area are the same. Regularizing the thumbnail width and the thumbnail height may make the target multimedia materials of different categories neatly displayed in the aggregation sharing message and keep the height consistent. As shown in the foregoing FIG. 7d or FIG. 7f, in some embodiments, a corresponding operation may be performed on the target multimedia material in the display area to view the target multimedia material in different manners.

The following content is specifically included.

Figure 7G:
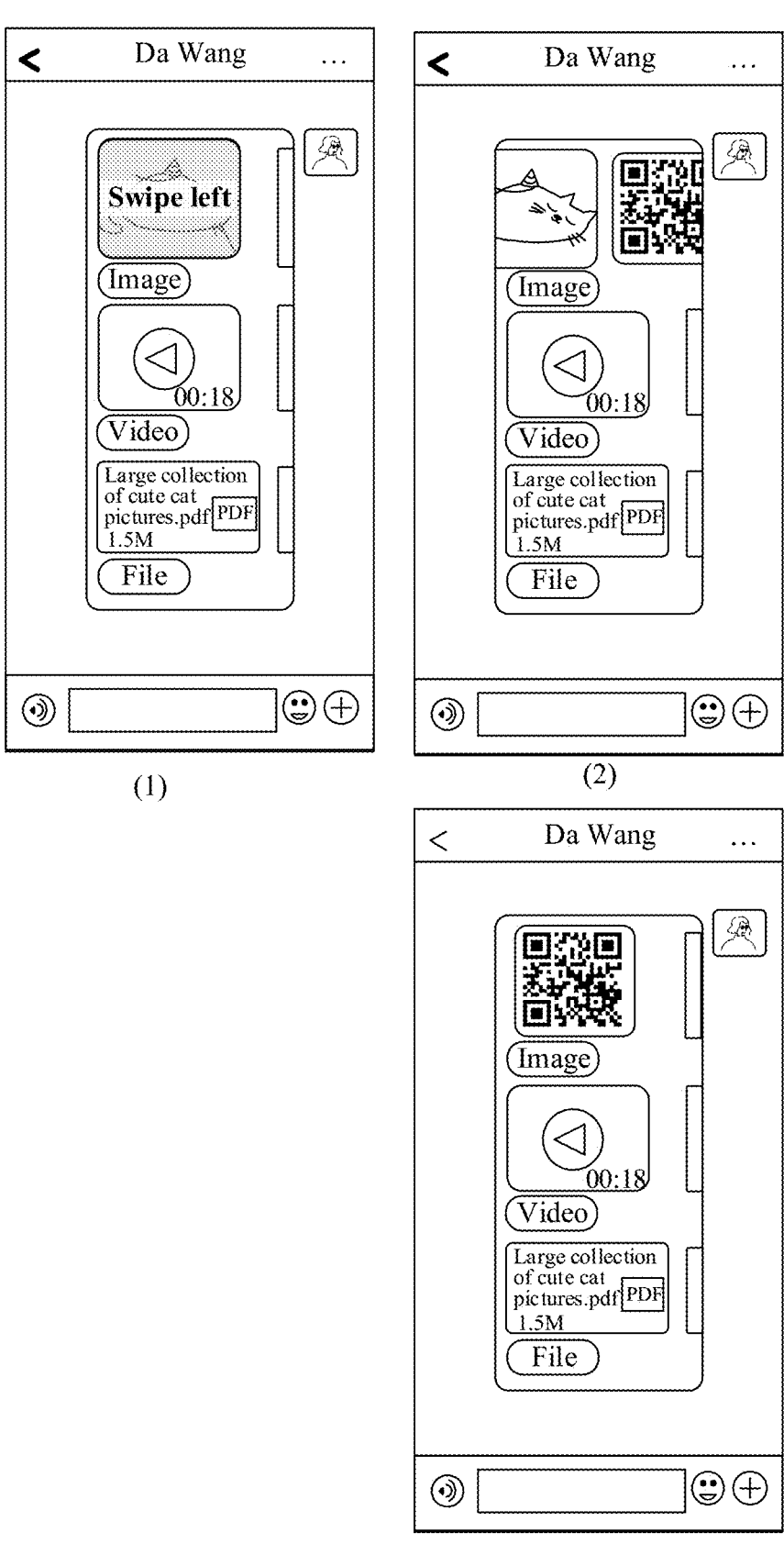
FIG. 7g is a schematic diagram of an effect of switching and displaying target multimedia materials in a display area according to some exemplary embodiments of the present disclosure.

(1) A plurality of target multimedia materials under a corresponding category are switched and displayed in a same display area of the aggregation sharing message. In other words, the target multimedia materials in the same display area in the aggregation sharing message support switching displaying, which may specifically be automatically switching and displaying. For example, a new target multimedia material under the category is switched and displayed every 6 seconds. Alternatively, switching displaying may be manually switching displaying, for example, performing a gesture operation of sliding to the left in the aggregation sharing interface for switching displaying. The corresponding category is a category to which the target multimedia material displayed in the display area belongs. In some embodiments, during switching displaying, the target multimedia material displayed under the corresponding category is hidden as a new target multimedia material is displayed until the new target multimedia material is fully displayed. Exemplarily, for a process of switching displaying, reference may be made to FIG. 7g. As shown in (1) in FIG. 7g, a picture material displayed in the display area displays a picture P1. When the gesture operation of sliding to the left is detected in the aggregation sharing interface, the picture P1 may be switched to a picture P2 adjacent to the picture P1 to be displayed in the display area. As shown in (2) in FIG. 7g, during switching, the picture P1 is gradually hidden and the picture P2 is gradually displayed. (3) in FIG. 7g is a schematic diagram of the picture P2 fully displayed in the display area. The video material and file material in the aggregation sharing message may also be executed based on the foregoing logic. Details are not described herein again.

When there are a plurality of target multimedia materials of a same category for aggregation sharing, target multimedia materials of a same category in a transmitted aggregation sharing message may be viewed by sliding left or right in a corresponding display area. For example: by sliding a picture set in the aggregation sharing message left and right (for example, left/right), different shared picture materials may be quickly switched and viewed. By sliding a video set in the aggregation sharing message left and right, different shared video materials may be quickly switched and viewed. By sliding a file set left and right, different shared file materials may be quickly switched and viewed. When multimedia materials of another category, such as a link, music, a mini program, or the like, are included in the aggregation sharing message in a collection manner, a same interaction manner may also exist, which is not described in detail herein. By switching displaying, different target multimedia materials under a corresponding category may be quickly and conveniently viewed in the display area.

(2) A material detail page is displayed in response to a viewing operation on any target multimedia material in the display area, and detail content of the operated target multimedia material is displayed on the material detail page.

Figure 7H:
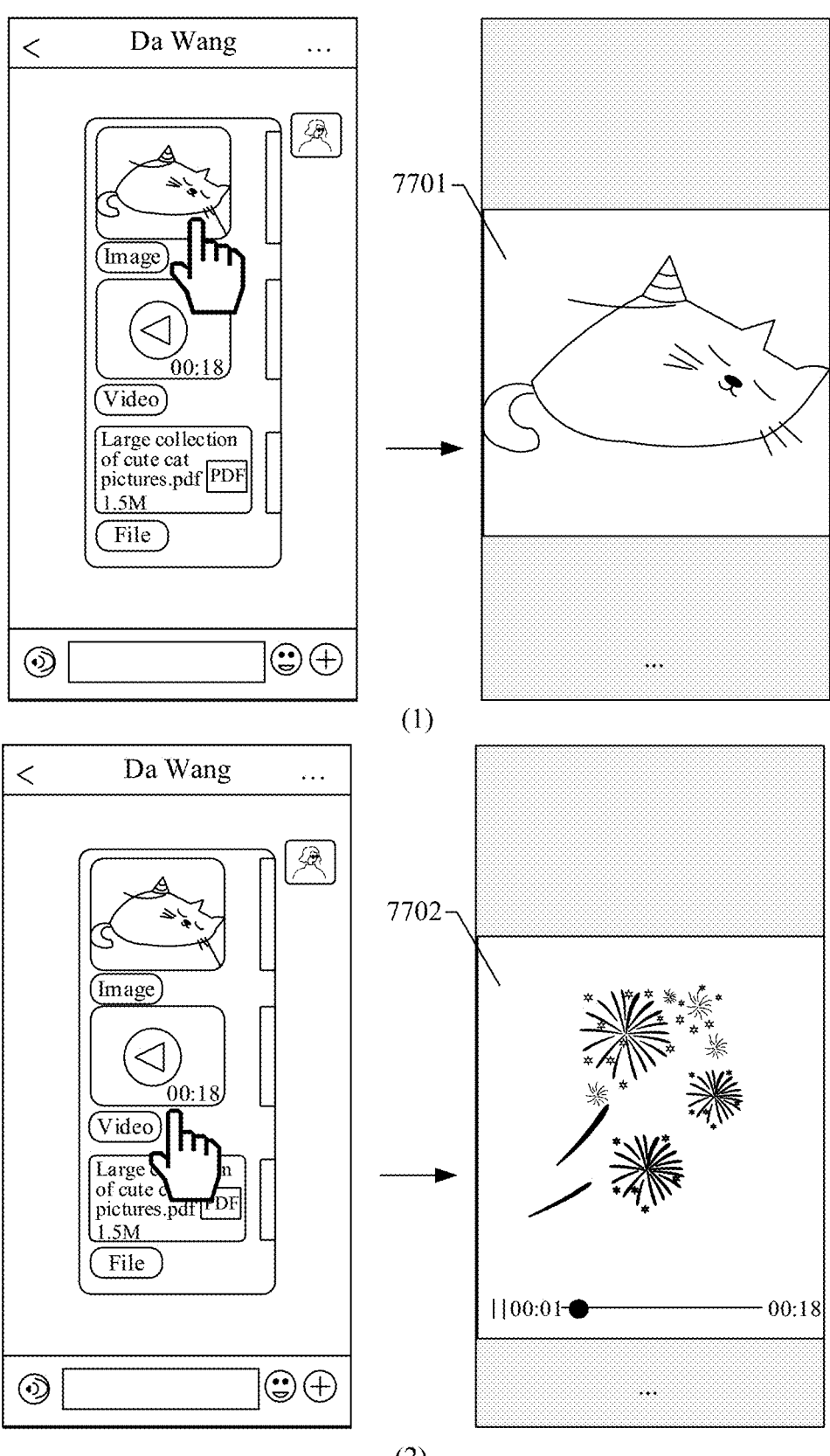
FIG. 7h is a schematic diagram of an operation of displaying detail content of a target multimedia material on a material detail page according to some exemplary embodiments of the present disclosure.

The any target multimedia material is a target multimedia material currently displayed in the display area, and the target multimedia material may be used as the operated target multimedia material. The viewing operation may be a gesture operation (for example, a tapping operation). The material detail page is for displaying the detail content of the operated target multimedia material. The material detail page may be a floating window in the aggregation sharing interface, or may be a new page. The viewing operation on any target multimedia material may cause the detail content of the target multimedia material to be displayed on the material detail page. For example, a picture in the display area is tapped, and picture detail may be presented based on an original proportion of the picture on the material detail page. Compared with displaying in a thumbnail manner in the display area, more detailed content of the multimedia material may be viewed on the material detail page. Exemplarily, FIG. 7h is a schematic diagram of an operation of displaying a target multimedia material on a material detail page. As shown in (1) in FIG. 7h, by tapping a picture material in an aggregation sharing interface, a material detail page may be displayed, and a picture 7701 at an original proportion is presented in a size adapted to a screen on the material detail page. As shown in (2) in FIG. 7h, by tapping a video material in the aggregation sharing interface, a material detail page may be displayed, and a video material 7702 is played based on an original proportion in a size adapted to the screen on the material detail page.

In some embodiments, detail content that is of multimedia materials of different categories and is presented on the material detail page is different, which specifically includes the following. When the operated target multimedia material is an image material, the image material is displayed on the material detail page based on an original proportion of an image; when the operated target multimedia material is a video material, the video material is played on the material detail page based on an original proportion of a video; when the operated target multimedia material is a file material, file content of the file material is browsed on the material detail page; when the operated target multimedia material is a mini program material, page content corresponding to the mini program material is browsed on the material detail page; and when the operated target multimedia material is an audio material, the audio material is played on the material detail page.

When a single picture is tapped in a display area for displaying target multimedia materials of an image category, picture detail may be presented based on an original proportion on the material detail page. When a single video is tapped in a display area for displaying target multimedia materials of a video category, the video may be played on the material detail page. In some embodiments, subtitles corresponding to the video may also be intelligently generated for displaying. When any file is tapped in a display area for displaying target multimedia materials of a file category, file content may be browsed on the material detail page. When any mini program is tapped in a display area for displaying target multimedia materials of a mini program category, detailed page content of the mini program may be displayed. When any audio is tapped in a display area for displaying target multimedia materials of an audio category, the audio may be played on the material detail page. For example, if the audio is music, lyrics may also be displayed. For another example, if the audio is speech, the audio may also be converted into text to be displayed and played synchronously.

Further, when the material detail page is displayed, the following implementation content may be further included: switching and displaying, in response to a switching viewing operation on the material detail page, a plurality of target multimedia materials under the category to which the operated target multimedia material belongs on the material detail page.

That is to say, in addition to displaying the operated target multimedia material, the material detail page may also be configured for displaying another target multimedia material under the category to which the operated target multimedia material belongs. For example, when a video material S1 is displayed on the material detail page, when a switching viewing operation on the material detail page is detected, the currently playing video material S1 may be switched, in response to the switching viewing operation, to a video material S2 to be displayed.

In some embodiments, the switching viewing operation includes one or more of the following: a gesture operation performed on the material detail page, a trigger operation performed on a switch control on the material detail page, and a trigger operation performed on a thumbnail of any target multimedia material on the material detail page. Specifically, the gesture operation performed on the material detail page may be a sliding operation, such as sliding left or right to switch and display different target multimedia materials under a same category. The switch control may be set on the material detail page. By triggering the switch control (for example, tapping the switch control), different target multimedia materials under the category may be switched and viewed. In addition, the material detail page may also display a thumbnail of the operated target multimedia material. By triggering (for example, tapping) the thumbnail of any target multimedia material, detail content of the corresponding target multimedia material may be quickly displayed. Compared with the gesture operation or the switch control where corresponding detail content is viewed based on an order of the target multimedia materials of the category, triggering the thumbnail may directly skip displaying of detail content of an intermediate target multimedia material on the material detail page (for example, detail of a first picture is currently displayed on the material detail page, and detail of a sixth picture needs to be checked next time), thereby more quickly reaching detail content of a target multimedia material wanted to be viewed. Exemplarily, FIG. 7*i* and FIG. 7*j* are schematic diagrams of switching and displaying target multimedia materials on a material detail page. As shown in (1) in FIG. 7*i*, tapping the material detail page may start switching displaying of picture materials. (2) in FIG. 7*i* shows a process of switching to a new picture in reality on the material detail page. In this case, a previous picture is gradually hidden and a next picture is gradually displayed. (3) in FIG. 7*i* shows an effect of completion of switching. As shown in (1) in FIG. 7*j*, a video material is displayed on the material detail page. When a "next" option is triggered on the material detail page, a switching displaying process may be started, to switch the current video material to a new video material to be displayed. A switching process is shown in (2) and (3) in FIG. 7*j*. The picture material and the video material that are switched and displayed are displayed on the material detail page based on original proportions.

In addition, in some embodiments, another interaction processing may also be performed on the detail content of the target multimedia material displayed on the material detail page. The interaction processing includes but is not limited to: performing a returning operation on the material detail page to exit the material detail page, and displaying a target conversation interface (for example, tapping single picture detail to exit the picture detail and return to a chat window interface); performing a saving operation on the material detail page to save the target multimedia material locally or in a cloud; and performing a sharing operation on the material detail page to share a single target multimedia material to another target sharing object again.

According to the social network application data processing solution provided in the embodiment of the present disclosure, various target multimedia materials may be classified and sorted into one or more aggregation sharing messages in a merging sharing manner. For example, target multimedia materials of each category in a plurality of categories are collectively displayed in a same aggregation sharing message. For example, a picture set, a video set, a file set, and the like are displayed in a message A. Because target multimedia materials of a same category in the aggregation sharing message may be displayed in a same display area, and different target multimedia materials under the category may be switched and displayed in the display area, not only the target multimedia material can be intuitively and quickly viewed preliminarily, but also the target multimedia materials of the same category are displayed in the same area, which can also greatly reduce a browsing height of multimedia content information, allowing a sharing object to quickly view material content of a same category, improving efficiency of viewing multimedia materials of multiple categories and human-computer interaction efficiency, additionally reducing an unnecessary user operation, thereby improving processing efficiency of a terminal device. In addition, by triggering displaying of the material detail page, detail content of the target multimedia material is also supported to be viewed on the material detail page, thereby implementing a more detailed viewing on the target multimedia material. In conclusion, this solution considers all aspects of a sharing process from perspectives of improving the human-computer interaction efficiency and improving utilization of display space of a terminal screen, and an efficient sharing manner is designed, which is not only convenient for sharing of a sharer, but also for browsing and viewing of the sharing object, greatly improving human-computer interaction efficiency in sharing and viewing complex information.

FIG. 8 is a schematic flowchart of a social network application data processing method according to an exemplary embodiment of the present disclosure. The social network application data processing method may be performed by a computer device (for example, the first terminal 100*a* in FIG. 1), and may be specifically performed by a social network application client run in the computer device, and the social network application data processing method may include the following content.

An aggregation sharing message is displayed on a terminal screen, and specifically, a target multimedia material in the aggregation sharing message is displayed on the terminal screen. For an implementation of displaying the target multimedia material in the aggregation sharing message on the terminal screen, reference may be made to content described in detail in the following S801 to S803. This embodiment may be specifically applied to the following scenarios: displaying the aggregation sharing message on a target conversation interface of the terminal screen, and displaying target multimedia materials of a corresponding category in a display area of the aggregation sharing message; and displaying a material detail page on the terminal screen, and displaying the target multimedia material on the material detail page.

S801: Obtain a display parameter of the terminal screen.

The display parameter of the terminal screen includes a size and resolution of a display screen of a terminal. Because display parameters of display screens of different terminals are different, an effect of displaying the target multimedia material on the terminal screen is different. For example, when a quantity of target multimedia materials is the same, a terminal screen with a larger size can display more target multimedia materials in an aggregation sharing message. Relatively speaking, a terminal screen with a smaller size displays fewer target multimedia materials in an aggregation sharing message. In addition, for a same target multimedia material, target multimedia materials in different terminals need to be adapted to terminal screens for displaying. For example, picture detail displayed on a mobile phone and picture detail displayed on a tablet computer are adapted to terminal screens, but both are different in size. By obtaining the display parameter of the terminal screen, a corresponding display container may be adapted to render the target multimedia material and be displayed on the terminal screen, to bring a better visual experience. For details, reference may be made to description of the following S802 and S803.

S802: Determine a display container adapted to the terminal screen according to the display parameter.

That the display container is adapted to the display parameter of the terminal screen means that a size of the display container is set based on a preset proportion of a size of the terminal screen. In other words, the larger the size of the terminal screen, the larger the size of the display container may be set.

The display container may include one or more of the following: a span container and a div container. The span container is configured to wrap a segment of text, for ease of adding a style to the text, and the div container may wrap any content (for example, an image, text, a video) and may also wrap with a container. In this embodiment of the present disclosure, the display container may be configured to wrap target multimedia (for example, a picture or text), or may also be configured to wrap detail content (for example, an element in mini program page content) in the target multimedia.

S803: Render and display the target multimedia material in the aggregation sharing message in the display container.

The target multimedia material in the aggregation sharing message may be placed in the display container for rendering and displaying. The shared aggregation sharing message includes at least one message body. A message body may be multimedia materials of a category. Correspondingly, a category of the message body may be text, an image, a video, audio, or the like. To ensure a good visual experience, text and an image in the message body may be rendered and presented through an adaptive terminal screen, specifically by using a container. For details, reference may be made to the following content description.

In some embodiments, the target multimedia material in the aggregation sharing message is an image material, and an implementation of S803 includes: obtaining rendering information of the display container and data information of the image material; processing the image material based on the rendering information of the display container and the data information of the image material; and placing a processed image material in the display container for rendering and displaying.

Rendering may be performed in the display container, and the rendering information of the display container may be obtained after rendering. In some embodiments, the rendering information includes at least one of the following: a width, a height, and an aspect ratio. An obtained image material may be a loaded network picture or a local picture, and the data information includes at least one of the following: a width, a height, and an aspect ratio. For example, a width, a height, and an aspect ratio of the network picture, and a width, a height, and an aspect ratio of the local picture may be fixed.

Because the image material may exceed the display container, the image material needs to be cropped. Specifically, this may be determined by comparing aspect ratios of the image material and the display container:

① When the aspect ratio of the image material is less than the aspect ratio of the display container, that a first cropping manner is applied to the image material is determined, where in the first cropping manner, a style width of the image material is set to the width of the display container, and a style height of the image material is set based on the height of the display container and the aspect ratio of the image material.

The aspect ratio is a ratio of a width to a height. The image material is a picture. If the aspect ratio of the image material is smaller than the aspect ratio of the display container, then the image material may be determined to be an extra-long image. In other words, the width is much smaller than the height. In this case, the width may be adapted to the display container to obtain the style width. The height of the image material needs to be cropped to obtain the style height adapted to the display container. In some embodiments, the image content of the image material beyond the display container is cropped based on a preset distance. Specifically: the style width of the image material=the width of the display container, the style height of the image material=the width of the container/the aspect ratio of the image material, and a distance between the image material and a top of the display container (referred to as a top distance for short below)=−(the style height of the image material−the height of the display container)/2. The image material may be cropped based on the top distance (namely, a preset distance for the extra-long image). In addition, a style of the image material is set to absolute positioning, referring to positioning of a display container element. The absolute positioning may enable a location of the image material to be independent of a document flow without occupying space.

② When the aspect ratio of the image material is greater than the aspect ratio of the display container, that a second cropping manner is applied to the image material is determined, where in the second cropping manner, the style height of the image material is set to the height of the display container, and the style width of the image material is set based on the width of the display container and the aspect ratio of the image material.

If the aspect ratio of the image material is greater than the aspect ratio of the display container, then the image material may be determined to be an extra-wide image. In other words, the width is much greater than the height. In this case, the height may be adapted to the display container to obtain the style height. The width of the image material needs to be cropped to obtain the style width adapted to the display container. In some embodiments, the image content of the image material beyond the display container is cropped based on a preset distance. Specifically: the style height of the image material=the height of the display container, the style width of the image material=the width of the display container*the aspect ratio of the image material, and a distance between the image material and a left of the display container (referred to as a left distance for short below)=−1*(the style width of the image material−the width of the display container)/2. The width of the image material may be cropped based on the left distance (namely, the preset distance of the extra-wide image) of the image material. Similarly, the style of the image material is set to absolute positioning, refer to the positioning of the display container element.

Based on the foregoing content, reference may be made to a flowchart of adaptive image rendering shown in FIG. 9a. For the image material, the image material is cropped in a cropping manner and is placed in a container for rendering. This can ensure that the image material does not deform in the container.

In some embodiments, the target multimedia material includes text, the target multimedia material in the aggregation sharing message is a text material, and an implementation of S803 includes: setting an initial height of the display container and a text-overflow threshold; placing the text in the display container for rendering, and obtaining a corresponding text rendering height; adjusting the initial height of the display container to the text rendering height; and rendering and displaying the text again by using an adjusted display container, where when the text rendering height is greater than the text-overflow threshold, overflowed text is hidden on the terminal screen.

Text may also be rendered adaptively by using the display container. First, the initial height of the display container may be set to be extra large, and the text-overflow threshold is set. In other words, the text overflows if exceeding the text-overflow threshold. The text-overflow threshold may be a text line quantity n. When the text line number exceeds n, an overflow dash effect occurs. For example, the overflowed text is hidden, and is replaced with another symbol (for example, an ellipsis). A height and a maxline (a maximum quantity of lines, for limiting a height of a text view so that the text view can have up to so many lines) may be set for a font by default to implement automatic line wrapping. Then the text of the target multimedia material is placed into the display container for first rendering. A text rendering height corresponding to rendered text is an actual rendering height of the text. The actual rendering height may be a quantity of lines of text rendering, and may be obtained through measurement by using a text measurement API. Afterwards, a height of a parent element (namely, the display container) may be set to an obtained value (namely, the text rendering height). In other words, the text rendering height is set for the display container, and then the text is rendered again based on an adjusted display container, and corresponding text is presented after rendering ends. Specifically: the text-overflow threshold and the text rendering height may be compared. If the text rendering height is less than the text-overflow threshold, all text content may be presented on the terminal screen after secondary rendering in the adjusted display container. In some embodiments, if the text rendering height is greater than the text-overflow threshold, the text overflows after being rendered in the display container. The overflowed text may be hidden on the terminal screen. For example, a text overflow is indicated by using the ellipsis.

Figure 9B:
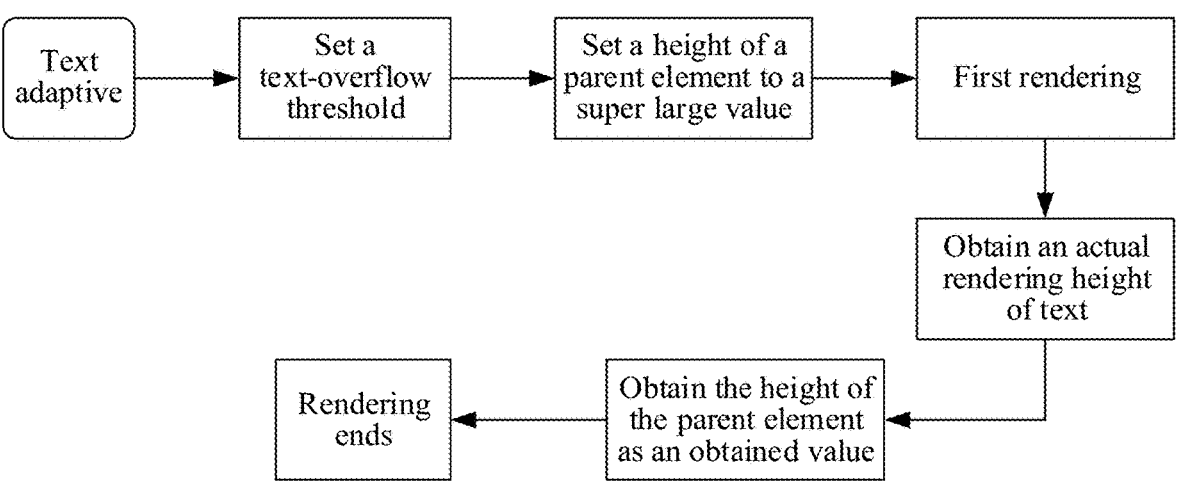
FIG. 9b is a flowchart of adaptive text rendering according to some exemplary embodiments of the present disclosure.

Based on the foregoing content, reference may be made to a flowchart of adaptive text rendering shown in FIG. 9*b*. Through adaptive text rendering, when the font included in the text does not reach n lines, the text may also be displayed adaptively on the terminal screen, thereby achieving different display effects.

In addition, when the target multimedia material is shared to another conversation object through the aggregation sharing message, the terminal may invoke, in response to an interaction operation (for example, an operation of tapping a sharing control in the aggregation sharing interface), a process in which a client interface performs aggregation sharing.

According to the solution provided in this embodiment of the present disclosure, during presenting an aggregation sharing message, content such as an image, text, and the like of the aggregation sharing message is adaptively processed, to be adapted to a terminal screen, thereby achieving a better display effect.

To better compare technical effects brought by this embodiment of the present disclosure, a sharing process of multimedia materials of multiple categories in a commonly used conversation message is described below. The following two manners are included: one is to merge and share the multimedia materials of multiple categories, and the other is to separately share the multimedia materials of multiple categories.

Figure 10A:
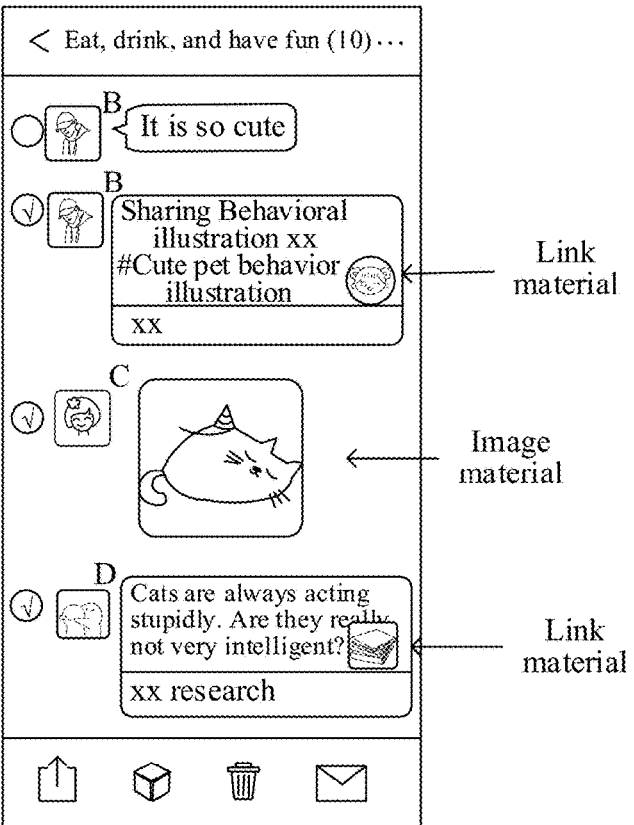
FIG. 10a is a schematic diagram of an effect of activating a historical chat message check box in a chat window according to some exemplary embodiments of the present disclosure.

A process for merging and sharing the multimedia materials of multiple categories includes the following steps s11 to s17.

s11: Long press any historical chat message in a chat window, to activate a "message operation panel".

s12: Perform an operation of tapping "multiple", to activate a historical chat message check box in the chat window, (as shown in FIG. 10*a*).

s13: Tap to select a plurality of multimedia materials that need to be shared in the historical chat message.

s14: Tap a sharing operation icon in a lower left corner of an interface, to activate a "forwarding manner panel".

s15: Tap a "forward one by one" or "merging forward" operation in the "forwarding manner panel", to open an "interface of selecting a chat object".

s16: In the "interface of selecting a chat object", tap to select a person for forwarding and sharing, and activate a "confirm transmitting pop-up window".

s17: Tap "transmit" in the "confirm transmitting pop-up window", to share the selected multimedia materials to a forwarding object. A final effect is shown in FIG. 10*b*.

It may be found that in this manner, when selecting multimedia materials to be shared, searching and selection can be performed only in an order in which historical conversation messages were sent, and multimedia materials of different categories are mixed together, which makes searching efficiency very low, and leads to low efficiency of object sharing and communication. In addition, the multimedia materials shared to the forwarding object are also cross-mixed together. As a result, efficiency of a sharing user in viewing information is not high.

Figure 10B:
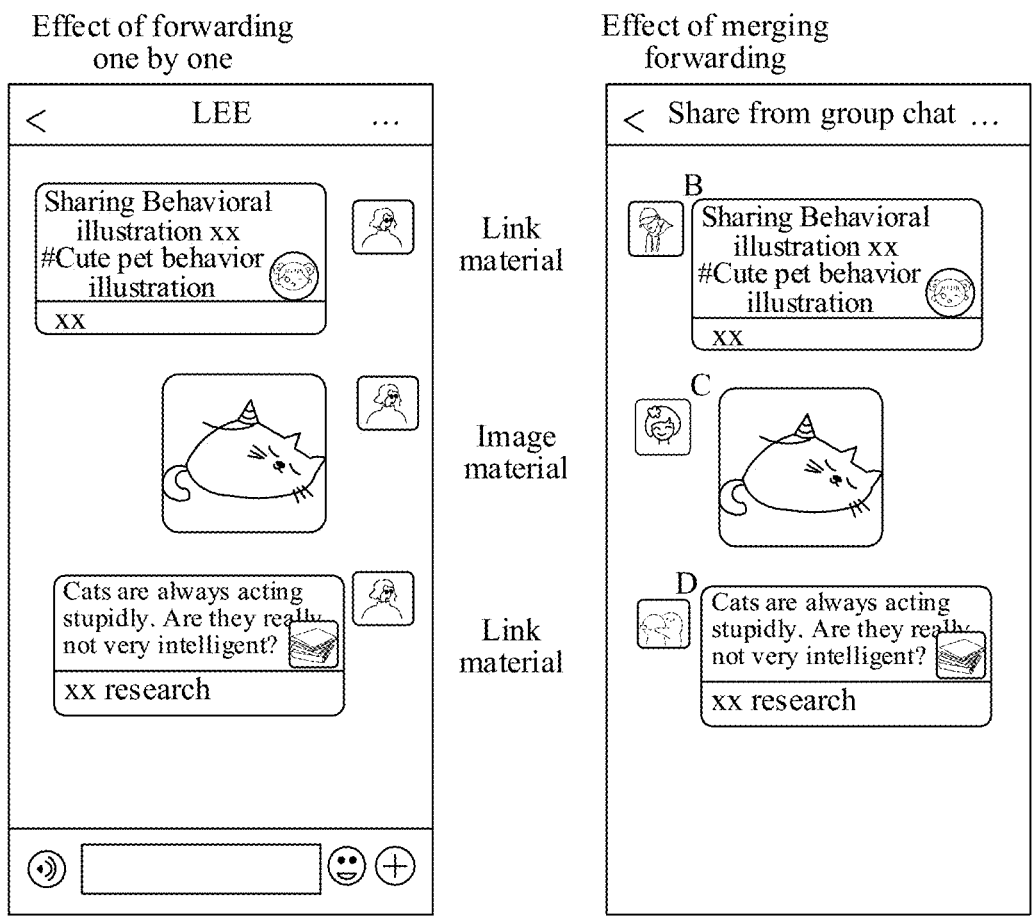
FIG. 10b is a schematic diagram of effects of sharing one by one and merging sharing in a regular manner according to some exemplary embodiments of the present disclosure.

Refer to schematic diagrams of cross-mixing of multimedia materials shown in FIG. 10*a* and FIG. 10*b*. FIG. 10*a* shows multimedia materials, including link materials and a picture material, that are cross-mixed together when searching for and selecting content to share in a chat window. Likewise, after selecting these multimedia materials to share with the forwarding object, no matter what the forwarding manner is, the multimedia materials are cross-mixed together. FIG. 10*b* are schematic diagrams of effects of forwarding one by one and merging forwarding, where displayed multimedia materials are sequentially a link material, a picture material, and a link material.

A process for separately sharing the multimedia materials of multiple categories includes the following step 1 to step 14.

Step 1: Tap a "more operations icon" in an upper right corner of an interface in a chat window, to open a "chat message management interface".

Step 2: Tap "search conversation records" in the "chat message management interface", to open a "search conversation records interface".

If there is a picture or video that needs to be shared, the following step 3 to step 8 are included.

Step 3: Tap "pictures and videos" in the "search conversation records interface", to open a "historical message picture and video material library".

Step 4: Tap "select" in an upper right corner of the "historical message picture and video material library", to activate a material multi-select box.

Step 5: Tap to select an image/video material to be shared and activate a "material operation panel".

Step 6: Tap a "sharing operation icon" in the "material operation panel", to open an "interface of selecting a chat object".

Step 7: In the "interface of selecting a chat object", tap an object for forwarding and sharing, and activate a "confirm transmitting pop-up window".

Step 8: Tap "transmit" in the "confirm transmitting pop-up window", to share the selected picture/video material to a forwarding object, and the interface automatically returns to the "historical message picture and video material library".

If there is a need to continuously share multimedia materials of another category, for example, to share a mini program, the following step 9 to step 14 are included.

Step 9: In the "historical message picture and video material library", tap a return operation icon in an upper left corner, to open the "search conversation records interface".

Step 10: Tap "mini program" in the "search conversation records interface", to open a "historical message mini program material library".

Step 11: Tap a mini program needed to be shared in the "historical message mini program material library", to open a corresponding mini program interface.

Step 12: Tap a "more operations icon" in an upper right corner of a mini program interface, to activate a "more operations panel".

Step 13: In the "more operations panel", tap an object for forwarding and sharing, and activate a "confirm transmitting pop-up window".

Step 14: Tap "transmit to chat" in the "confirm transmitting pop-up window", to share the selected mini program material to the forwarding object.

It may be seen that there are many steps to search for multimedia materials in historical conversation messages by category and share the multimedia materials with a forwarding object. Multimedia materials of different categories (including a picture, a video, a file, a link, music, a mini program, and the like) need to be selected separately and shared separately. Some multimedia materials (for example, files) do not support multiple selections for transmitting simultaneously. This operation is very inconvenient, resulting in low efficiency of sharing and communication with a conversation object.

In conclusion, when multimedia materials of multiple categories are simultaneously shared, searching efficiency of multimedia materials that need to be shared is low, and viewing efficiency of multimedia materials shared to another conversation object is also not high. When the multimedia materials of multiple categories are shared separately, operation steps are complicated and very inconvenient.

However, according to the social network application data processing solution provided in this embodiment of the present disclosure, multimedia materials of different categories may be one-stop selected in an aggregation sharing interface, and there is no need to perform selection separately. In other words, there is no need of loading of a new page (material selection page) and returning of an old page (category selection page). In addition, through the aggregation sharing interface, the multimedia materials of different categories can be classified and sorted. For example, the multimedia materials are classified and sorted together based on the categories of the multimedia materials. In this way, multimedia materials of multiple categories to be shared can be quickly and conveniently searched and selected based on the categories/sources, and efficiency of searching and selecting the multimedia material is improved. In addition, a plurality of the multimedia materials of different categories support can be transmitted simultaneously. The transmitted multimedia materials are not cross-mixed for displaying, but are sorted by category, and quick switching to view different multimedia materials under a category in a same area is supported, which is very convenient for a sharing object to view, thereby effectively improving viewing efficiency.

Figure 11:
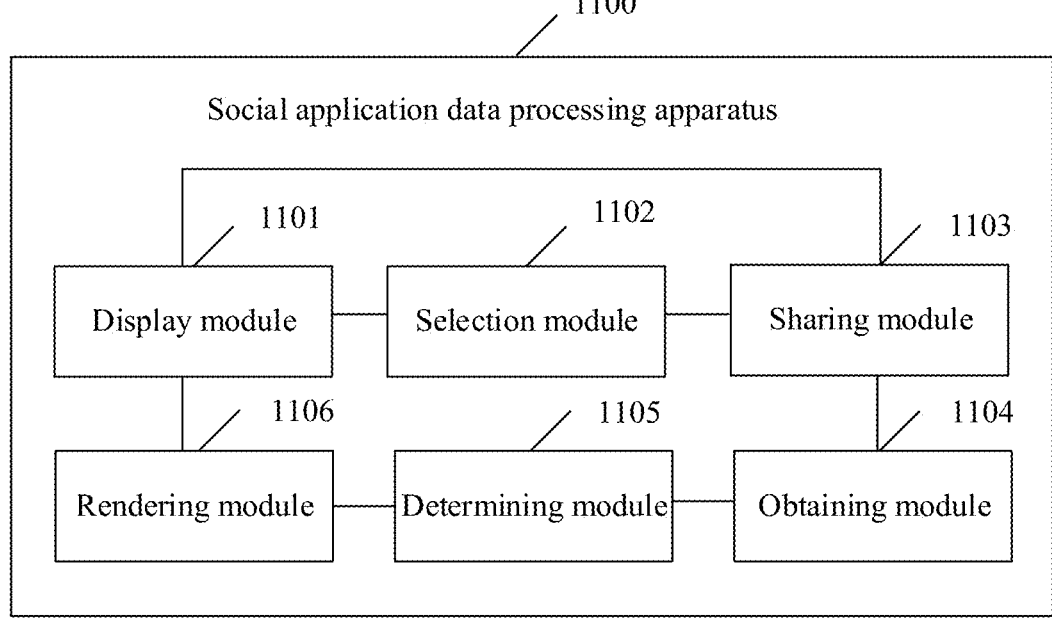
FIG. 11 is a schematic diagram of a structure of a social network application data processing apparatus according to some exemplary embodiments of the present disclosure.

FIG. 11 is a schematic flowchart of a structure of a social network application data processing apparatus according to an exemplary embodiment of the present disclosure. The foregoing social network application data processing apparatus may be a computer program (including program code) run on a computer device. For example, the social network application data processing apparatus is application software. The social network application data processing apparatus may be configured to perform corresponding steps in the method provided in this embodiment of the present disclosure. As shown in FIG. 11, a social network application data processing apparatus 1100 may include at least one of the following: a display module 1101, a selection module 1102, a sharing module 1103, an obtaining module 1104, a determining module 1105, and a rendering module 1106.

The display module 1101 is configured to display an aggregation sharing interface in response to a trigger operation on an aggregation sharing portal, the aggregation sharing interface including multimedia materials of one or more categories;

the selection module 1102 is configured to determine, in response to a selection operation on N target multimedia materials in the multimedia materials in the aggregation sharing interface, the selected N target multimedia materials as N sharing target multimedia materials, N being a positive integer; and the sharing module 1103 is configured to generate one or more aggregation sharing messages for the N target multimedia materials based on the categories, and transmit the one or more aggregation sharing messages to a sharing object for aggregation sharing.

In some embodiments, a material selection area is provided in the aggregation sharing interface; and multimedia materials of multiple categories are displayed in the material selection area, where the categories include one or more of the following: an image, a video, audio, a file, a link, and a mini program.

In some embodiments, a process of displaying the multimedia materials of multiple categories in the material selection area includes any one of the following: displaying by category in the material selection area based on the categories of the multimedia materials; displaying, when the multimedia materials of multiple categories are sourced from one or more social conversations, in partitions in the material selection area based on sources of the multimedia materials, where different partitions correspond to multimedia materials from different social conversations; and for multimedia materials from a same conversation when the multimedia materials of multiple categories are sourced from one or more social conversations, displaying in chronological order in the material selection area based on transmitting time of the multimedia materials in the social conversation.

In some embodiments, the display module 1101 is further configured to: display a preview of the selected N sharing target multimedia materials in the aggregation sharing interface.

In some embodiments, a material preview area is provided in the aggregation sharing interface; the display module 1101 is specifically configured to: display the selected N sharing target multimedia materials in the material preview area; and a process of displaying the N target multimedia materials in the material preview area includes any one of the following: displaying the N target multimedia materials by category in the material preview area based on the categories; displaying in chronological order based on selected time of the N target multimedia materials; and displaying the N target multimedia materials in random order.

In some embodiments, a material selection area and a material preview area are provided in the aggregation sharing interface; the material selection area is configured for displaying the multimedia materials of multiple categories; the material preview area is configured for displaying the selected sharing target multimedia material; and the display module 1101 is further configured to: add and display, when a sharing target multimedia material is selected in the material selection area, the selected target multimedia material in the material preview area; synchronously delete, when a selected sharing target multimedia material is deselected in the material selection area, the deselected target multimedia material in the material preview area; and synchronously deselect, when a sharing target multimedia material is deleted in the material preview area, the deleted target multimedia material in the material selection area.

In some embodiments, the display module 1101 is further configured to: display the selected target multimedia material and an unselected multimedia material differently in the material selection area, where the displaying differently includes any one of the following: displaying differently through different colors, displaying differently through different statuses, and displaying differently through different locations.

In some embodiments, the sharing module 1103 is configured to: display a sharing object list; and transmit the one or more aggregation sharing messages to a selected target sharing object in the sharing object list, where the one or more aggregation sharing messages are obtained by aggregating the N target multimedia materials based on the categories.

In some embodiments, the N target multimedia materials are clustered into M categories, where M is a positive integer; and the N target multimedia materials are aggregated into P aggregation sharing messages based on the categories, where P is less than or equal to M; when P=M, target multimedia materials of one category are aggregated into one aggregation sharing message, and target multimedia materials of different categories are aggregated into different aggregation sharing messages; and when P<M, target multimedia materials of one or more categories are aggregated into a same aggregation sharing message.

In some embodiments, each aggregation sharing message displayed in a conversation interface includes a display area, and target multimedia materials of a same category are displayed in a same display area in a same aggregation sharing message; and when an aggregation sharing message includes target multimedia materials of multiple categories, target multimedia materials of a same category are displayed in a same display area in the aggregation sharing message, and target multimedia materials of different categories are displayed in different display areas in the aggregation sharing message.

In some embodiments, the target multimedia material is displayed in a thumbnail manner based on a preset proportion in the display area of the aggregation sharing message; and mark information corresponding to the target multimedia material is displayed at a preset location of the aggregation sharing message, where the mark information includes at least one of the following: a category, a source, a size, and duration.

In some embodiments, the display module 1101 is further configured to: switch and display a plurality of target multimedia materials under a corresponding category in a same display area of each aggregation sharing message; display a material detail page in response to a viewing operation on any target multimedia material in the display area, and display detail content of the operated target multimedia material on the material detail page; and switch and display, in response to a switching viewing operation on the material detail page, a plurality of target multimedia materials under the category to which the operated target multimedia material belongs on the material detail page, where the switching viewing operation includes one or more of the following: a gesture operation performed on the material detail page, a trigger operation performed on a switch control on the material detail page, and a trigger operation performed on a thumbnail of any target multimedia material on the material detail page.

In some embodiments, the display module 1101 is specifically configured to: display, when the operated target multimedia material is an image material, the image material on the material detail page based on an original proportion of an image; play, when the operated target multimedia material is a video material, the video material on the material detail page based on an original proportion of a video; browse, when the operated target multimedia material is a file material, file content of the file material on the material detail page; browse, when the operated target multimedia material is a mini program material, page content corresponding to the mini program material on the material detail page; and play, when the operated target multimedia material is an audio material, the audio material on the material detail page.

In some embodiments, the display module 1101 is specifically configured to: display a social conversation interface, where the social conversation interface includes the aggregation sharing portal; and display the aggregation sharing interface in response to the trigger operation on the aggregation sharing portal, where the aggregation sharing portal is fixedly displayed in the social conversation interface; or the aggregation sharing portal is hidden in the social conversation interface by default, and when the aggregation sharing portal is awakened, the aggregation sharing portal is displayed in the social conversation interface.

In some embodiments, the one or more aggregation sharing messages are displayed on a terminal screen, and the obtaining module 1104 is configured to obtain a display parameter of the terminal screen; the determining module 1105 is configured to determine a display container adapted to the terminal screen according to the display parameter; and the rendering module 1106 is configured to render and display the target multimedia material in the one or more aggregation sharing messages in the display container.

In some embodiments, the target multimedia material in the aggregation sharing message is an image material, and the rendering module 1106 is specifically configured to: obtain rendering information of the display container and data information of the image material; process the image material based on the rendering information of the display container and the data information of the image material; and place a processed image material in the display container for rendering and displaying.

In some embodiments, the rendering information includes at least one of the following: a width, a height, and an aspect ratio; the data information includes at least one of the following: a width, a height, and an aspect ratio; and the rendering module 1106 is configured to: determine, when the aspect ratio of the image material is less than the aspect ratio of the display container, that a first cropping manner is applied to the image material, where in the first cropping manner, a style width of the image material is set to the width of the display container, and a style height of the image material is set based on the height of the display container and the aspect ratio of the image material; and determine, when the aspect ratio of the image material is greater than the aspect ratio of the display container, that a second cropping manner is applied to the image material, where in the second cropping manner, the style height of the image material is set to the height of the display container, and the style width of the image material is set based on the width of the display container and the aspect ratio of the image material, where image content of the image material beyond the display container is cropped based on a preset distance.

In some embodiments, the target multimedia material includes text, and the rendering module 1106 is specifically further configured to: set an initial height of the display container and a text-overflow threshold; place the text in the display container for rendering, and obtain a corresponding text rendering height; adjust the initial height of the display container to the text rendering height; and render and display the text again by using an adjusted display container, where when the text rendering height is greater than the text-overflow threshold, overflowed text is hidden on the terminal screen.

It may be understood that, a function of each functional module of the social network application data processing apparatus described in this embodiment of the present disclosure may be specifically implemented according to the method in the foregoing method embodiment. For a specific implementation process thereof, reference may be made to related description of the foregoing method embodiment, and details are not described herein again. In addition, the description of beneficial effects of the same method is not described herein again.

Figure 12:
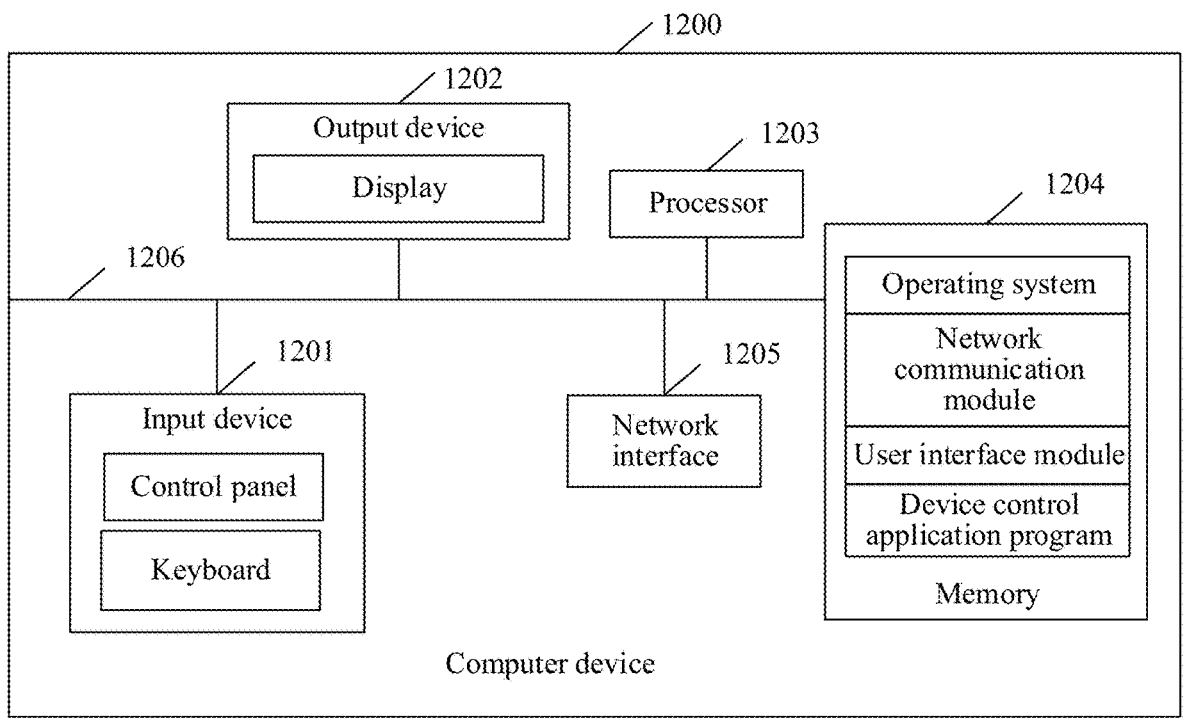
FIG. 12 is a schematic diagram of a structure of a computer device according to some exemplary embodiments of the present disclosure.

FIG. 12 is a schematic structural diagram of a computer device according to an embodiment of the present disclosure. As shown in FIG. 12, the computer device may be a terminal device, and may specifically include an input device 1201, an output device 1202, a processor 1203, a memory 1204, a network interface 1205, and at least one communication bus 1206. The processor 1203 may be a central processing unit (CPU). The processor may further include a hardware chip. The foregoing hardware chip may be an application-specific integrated circuit (ASIC), a programmable logic device (PLD), or the like. The foregoing PLD may be a field-programmable gate array (FPGA), a generic array logic (GAL), or the like.

The memory 1204 may include a volatile memory, for example, a random-access memory (RAM). The memory 1204 may also include a non-volatile memory, for example, a flash memory, or a solid-state drive (SSD). The memory 1204 may be a high-speed RAM memory, or may be a non-volatile memory, for example, at least one magnetic disk memory. Optionally, the memory 1204 may alternatively be at least one storage apparatus that is located far away from the foregoing processor 1203. The memory 1204 may alternatively include a combination of the foregoing types of memories. As shown in FIG. 12, the memory 1204 used as a computer-readable storage medium may include an operating system, a network communication module, a user interface module, and a device-control application program.

The network interface 1205 may include a standard wired interface and a standard wireless interface (such as a Wi-Fi interface). Used as a communication interface, the network interface may be configured to provide a data communication function. The communication bus 1206 is responsible for connecting each communication element. The input device 1201 receives instructions input by a user, to generate a signal input related to user setting and functional control of the terminal device. In some embodiments, the input device 1201 includes, but is not limited to, one or more of a touch panel, a physical keyboard, or a virtual keyboard, a functional key, and a mouse. The output device 1202 is configured to output data information. In this embodiment of the present disclosure, the output device 1202 may be configured to display an aggregation sharing interface, output an aggregation sharing message, and the like. The output device 1202 may include a display or another display device. The processor 1203 is a control center of the terminal device, connects components of the entire terminal device by using various interfaces and buses, and performs various functions by scheduling and running a computer program stored in the memory 1204.

The processor 1203 may be configured to invoke the computer program in the memory to perform the following operation: displaying an aggregation sharing interface through the output device 1202, the aggregation sharing interface including multimedia materials of one or more categories; selecting N sharing target multimedia materials in the aggregation sharing interface, N being a positive integer; and performing aggregation sharing on the selected N target multimedia materials based on the categories.

It is to be understood that the computer device 1200 described in this embodiment of the present disclosure may implement the description of the social network application data processing method in the foregoing corresponding embodiment, or may also implement the description of the social network application data processing apparatus 1100 in the foregoing embodiment corresponding to FIG. 11. Details are not described herein again. In addition, the description of beneficial effects of the same method is not described herein again.

In addition, an exemplary embodiment of the present disclosure further provides a storage medium. The storage medium stores a computer program of the foregoing social network application data processing method. The computer program includes program instructions. When one or more processors load and execute the program instructions, the description of the social network application data processing method in the embodiment may be implemented, which is not described herein again. Description of a beneficial effect of using the same method is not described herein again. It may be understood that, the program instructions may be deployed and executed on one or more computer devices capable of communicating with each other.

The foregoing computer-readable storage medium may be the social network application data processing apparatus provided in any foregoing embodiment, or an internal storage unit of the foregoing computer device, for example, a hard disk or an internal memory of the computer device. The computer-readable storage medium may alternatively be an external storage device of the computer device, for example, a removable hard disk, a smart media card (SMC), a secure digital (SD) card, or a flash card equipped on the computer device. Further, alternatively, the computer-readable storage medium may include both an internal storage unit and an external storage device of the computer device. The computer-readable storage medium is configured to store the computer program and another program and data that are required by the computer device. The computer-readable storage medium may be further configured to temporarily store data that has been output or data to be output.

According to an aspect of the present disclosure, a computer program product or a computer program is provided, the computer program product or the computer program including computer instructions, the computer instructions being stored in a computer-readable storage medium. A processor of a computer device reads the computer instructions from the computer-readable storage medium, and executes the computer instructions, so that the computer device performs the method according to an aspect of the embodiments of the present disclosure.

According to an aspect of the present disclosure, another computer program product is provided, the computer program product including a computer program or computer instructions, when the computer program or computer instructions are executed by a processor, steps of the social network application data processing method according to the embodiments of the present disclosure being implemented.

A sequence of the steps of the method in the embodiments of the present disclosure may be adjusted, and certain steps may also be combined or removed according to an actual requirement.

The modules in the apparatus in the embodiments of the present disclosure may be combined, divided, and deleted according to an actual requirement.

The foregoing descriptions are merely some embodiments of the present disclosure, and are not intended to limit the scope of the present disclosure. A person skilled in the art may understand all or some processes of the foregoing embodiments, and equivalent modifications made according to the claims of the present disclosure shall still fall within the scope of the present disclosure.

What is claimed is:

1. A social network application data processing method, performed by a computer device, the method comprising:

displaying a message history of a candidate social conversation in a chat window of a social networking service (SNS) application, the message history including multimedia materials previously transmitted in the candidate social conversation in a message form;

displaying an aggregation sharing interface in response to a trigger operation on an aggregation sharing portal, the aggregation sharing interface comprising the multimedia materials of multiple categories from the message history;

displaying, in response to a multimedia material being selected on the aggregation sharing interface, a preview of the selected multimedia material in a selected material preview area of the aggregation sharing interface, and simultaneously displaying previews of the multimedia materials of one of the multiple categories in a candidate material preview area of the aggregation sharing interface, wherein the previews of the multimedia materials from the message history are nested under a plurality of view tags, each view tag corresponding to one of the multiple categories, and a selection of a view tag triggers the aggregation sharing interface to display multimedia materials of the category corresponding to the selected view tag;

determining, in response to a selection operation on sharing N target multimedia materials in the multimedia materials in the aggregation sharing interface, the selected N target multimedia materials as N sharing target multimedia materials, and N being a positive integer greater than 1; and generating one or more aggregation sharing messages for the N sharing target multimedia materials based on the multiple categories, and transmitting the one or more aggregation sharing messages to a sharing object for aggregation sharing.

2. The method according to claim 1, wherein a material selection area is provided in the aggregation sharing interface; the multimedia materials of the multiple categories are displayed in the material selection area; and the multiple categories comprise one or more of following: an image, a video, audio, a file, a link, and a mini program.

3. The method according to claim 2, wherein a process of displaying the multimedia materials of the multiple categories in the material selection area comprises:

displaying by category in the material selection area based on the multiple categories of the multimedia materials;

displaying, in response to the multimedia materials of the multiple categories being sourced from one or more social conversations, in partitions in the material selection area based on sources of the multimedia materials, wherein different partitions correspond to multimedia materials from different social conversations, the one or more social conversations comprising the candidate social conversation; and for multimedia materials from a same conversation in response to the multimedia materials of the multiple categories being sourced from one or more social conversations, displaying in chronological order in the material selection area based on transmitting time of the multimedia materials in the social conversation.

4. The method according to claim 2, further comprising:

displaying the selected target multimedia material and an unselected multimedia material differently in the material selection area, wherein the displaying differently comprises any one of following: displaying differently through different colors, displaying differently through different statuses, and displaying differently through different locations.

5. The method according to claim 1, further comprising: displaying a preview of the selected N sharing target multimedia materials in the aggregation sharing interface.

6. The method according to claim 5, wherein a material preview area is provided in the aggregation sharing interface; displaying the preview of the selected N sharing target multimedia materials in the aggregation sharing interface comprises: displaying the selected N sharing target multimedia materials in the material preview area; and a process of displaying the N target multimedia materials in the material preview area comprises any one of following:

displaying the N target multimedia materials by category in the material preview area based on the category;

displaying in chronological order based on selected time of the N target multimedia materials; and displaying the N target multimedia materials in a random order.

7. The method according to claim 1, further comprising:

adding and displaying, in response to a sharing target multimedia material being selected in the candidate material preview area, the selected target multimedia material in the selected material preview area;

synchronously deleting, in response to a selected sharing target multimedia material being deselected in the candidate material preview area, the deselected target multimedia material in the selected material preview area; and synchronously deselecting, in response to a sharing target multimedia material is deleted in the selected material preview area, the deleted target multimedia material in the candidate material preview area.

8. The method according to claim 1, wherein generating the one or more aggregation sharing messages for the N target multimedia materials based on the multiple categories, and transmitting the one or more aggregation sharing messages to the sharing object for aggregation sharing comprises:

displaying a sharing object list; and transmitting the one or more aggregation sharing messages to a selected target sharing object in the sharing object list, wherein the one or more aggregation sharing messages are obtained by aggregating the N target multimedia materials based on the multiple categories.

9. The method according to claim 8, wherein the N target multimedia materials are clustered into M categories, wherein M is a positive integer greater than 1; the N target multimedia materials are aggregated into P aggregation sharing messages based on the multiple categories, wherein P is less than or equal to M;

when P=M, target multimedia materials of one category are aggregated into one aggregation sharing message, and target multimedia materials of different categories are aggregated into different aggregation sharing messages; or when P<M, target multimedia materials of one or more categories are aggregated into a same aggregation sharing message.

10. The method according to claim 9, wherein an aggregation sharing message displayed in a conversation interface comprises a display area, and the target multimedia materials of the same category are displayed in a same display area in a same aggregation sharing message; and in response to an aggregation sharing message including target multimedia materials of multiple categories, target multimedia materials of a same category are displayed in a same display area in the aggregation sharing message, and target multimedia materials of different categories are displayed in different display areas in the aggregation sharing message.

11. The method according to claim 10, wherein the target multimedia material is displayed in a thumbnail manner based on a preset proportion in the display area of the aggregation sharing message; and mark information corresponding to the target multimedia material is displayed at a preset location of the aggregation sharing message, wherein the mark information comprises at least one of following: a category, a source, a size, or duration.

12. The method according to claim 10, further comprising:

switching and displaying a plurality of target multimedia materials under a corresponding category in a same display area of the aggregation sharing message;

displaying a material detail page in response to a viewing operation on any target multimedia material in the display area, and displaying detail content of the operated target multimedia material on the material detail page; and switching and displaying, in response to a switching viewing operation on the material detail page, a plurality of target multimedia materials under the category to which the operated target multimedia material belongs on the material detail page, wherein the switching viewing operation comprises one or more of following: a gesture operation performed on the material detail page, a trigger operation performed on a switch control on the material detail page, and a trigger operation performed on a thumbnail of any target multimedia material on the material detail page.

13. The method according to claim 12, wherein displaying the detail content of the operated target multimedia material on the material detail page comprises:

displaying, in response to the operated target multimedia material being an image material, the image material on the material detail page based on an original proportion of an image;

playing, in response to the operated target multimedia material being a video material, the video material on the material detail page based on an original proportion of a video;

browsing, in response to the operated target multimedia material being a file material, file content of the file material on the material detail page;

browsing, in response to the operated target multimedia material being a mini program material, page content corresponding to the mini program material on the material detail page; and playing, in response to the operated target multimedia material being an audio material, the audio material on the material detail page.

14. The method according to claim 8, wherein the one or more aggregation sharing messages are displayed on a terminal screen, and the method further comprises:

obtaining a display parameter of the terminal screen;

determining a display container adapted to the terminal screen according to the display parameter; and rendering and displaying the target multimedia material in the one or more aggregation sharing messages in the display container.

15. The method according to claim 14, wherein the target multimedia material in the one or more aggregation sharing messages is the image material, and rendering and displaying the target multimedia material in the one or more aggregation sharing messages in the display container comprises:

obtaining rendering information of the display container and data information of the image material;

processing the image material based on the rendering information of the display container and the data information of the image material; and placing a processed image material in the display container for rendering and displaying.

16. The method according to claim 15, wherein the rendering information comprises at least one of following: a width, a height, or an aspect ratio; the data information comprises at least one of following: a width, a height, or an aspect ratio; and processing the image material based on the rendering information of the display container and the data information of the image material comprises:

determining, in response to aspect ratio of the image material being less than aspect ratio of the display container, that a first cropping manner is applied to the image material, wherein in the first cropping manner, a style width of the image material is set to the width of the display container, and a style height of the image material is set based on the height of the display container and the aspect ratio of the image material; and determining, in response to the aspect ratio of the image material being greater than the aspect ratio of the display container, that a second cropping manner is applied to the image material, wherein in the second cropping manner, the style height of the image material is set to the height of the display container, and the style width of the image material is set based on the width of the display container and the aspect ratio of the image material, wherein image content of the image material beyond the display container is cropped based on a preset distance.

17. The method according to claim 16, wherein the target multimedia material comprises text, and rendering and displaying the target multimedia material in the one or more aggregation sharing messages in the display container comprises:

setting an initial height of the display container and a text-overflow threshold;

placing the text in the display container for rendering, and obtaining a corresponding text rendering height;

adjusting the initial height of the display container to the text rendering height; and rendering and displaying the text again by using an adjusted display container, wherein in response to the text rendering height being greater than the text-overflow threshold, overflowed text is hidden on the terminal screen.

18. The method according to claim 1, wherein displaying the aggregation sharing interface in response to the trigger operation on the aggregation sharing portal comprises:

displaying a social conversation interface, wherein the social conversation interface comprises the aggregation sharing portal; and displaying the aggregation sharing interface in response to the trigger operation on the aggregation sharing portal, wherein the aggregation sharing portal is fixedly displayed in the social conversation interface; or the aggregation sharing portal is hidden in the social conversation interface by default, and in response to the aggregation sharing portal being awakened, the aggregation sharing portal is displayed in the social conversation interface.

19. A computer device, comprising: one or more processors, and a memory, the one or more processors being connected to the memory, the memory being configured to store program code, and the one or more processors being configured to invoke the program code to perform:

displaying a message history of a candidate social conversation in a chat window of a social networking service (SNS) application, the message history including multimedia materials previously transmitted in the candidate social conversation in a message form;

displaying an aggregation sharing interface in response to a trigger operation on an aggregation sharing portal, the aggregation sharing interface comprising the multimedia materials of multiple categories from the message history;

displaying, in response to a multimedia material being selected on the aggregation sharing interface, a preview of the selected multimedia material in a selected material preview area of the aggregation sharing interface, and simultaneously displaying previews of the multimedia materials of one of the multiple categories in a candidate material preview area of the aggregation sharing interface, wherein the previews of the multimedia materials from the message history are nested under a plurality of view tags, each view tag corresponding to one of the multiple categories, and a selection of a view tag triggers the aggregation sharing interface to display multimedia materials of the category corresponding to the selected view tag;

determining, in response to a selection operation on sharing N target multimedia materials in the multimedia materials in the aggregation sharing interface, the selected N target multimedia materials as N sharing target multimedia materials, and N being a positive integer greater than 1; and generating one or more aggregation sharing messages for the N sharing target multimedia materials based on the multiple categories, and transmitting the one or more aggregation sharing messages to a sharing object for aggregation sharing.

20. A non-transitory computer-readable storage medium, storing a computer program, the computer program comprising program instructions, the program instructions, when being executed, causing one or more processors to perform:

displaying a message history of a candidate social conversation in a chat window of a social networking service (SNS) application, the message history including multimedia materials previously transmitted in the candidate social conversation in a message form;

displaying an aggregation sharing interface in response to a trigger operation on an aggregation sharing portal, the aggregation sharing interface comprising the multimedia materials of multiple categories from the message history;

displaying, in response to a multimedia material being selected on the aggregation sharing interface, a preview of the selected multimedia material in a selected material preview area of the aggregation sharing interface, and simultaneously displaying previews of the multimedia materials of one of the multiple categories in a candidate material preview area of the aggregation sharing interface, wherein the previews of the multimedia materials from the message history are nested under a plurality of view tags, each view tag corresponding to one of the multiple categories, and a selection of a view tag triggers the aggregation sharing interface to display multimedia materials of the category corresponding to the selected view tag;

determining, in response to a selection operation on sharing N target multimedia materials in the multimedia materials in the aggregation sharing interface, the selected N target multimedia materials as N sharing target multimedia materials, and N being a positive integer greater than 1; and generating one or more aggregation sharing messages for the N sharing target multimedia materials based on the multiple categories, and transmitting the one or more aggregation sharing messages to a sharing object for aggregation sharing.

* * * * *